(12) United States Patent
Kirar

(10) Patent No.: US 11,648,811 B2
(45) Date of Patent: May 16, 2023

(54) ADJUSTABLE GAS SPRING SYSTEM

(71) Applicant: ARNOTT T&P HOLDING, LLC, Merritt Island, FL (US)

(72) Inventor: Matt Edward Kirar, Merritt Island, FL (US)

(73) Assignee: ARNOTT T&P HOLDING, LLC, Merritt Island, FL (US)

( * ) Notice: Subject to any disclaimer, the term of this patent is extended or adjusted under 35 U.S.C. 154(b) by 0 days.

(21) Appl. No.: 16/899,833

(22) Filed: Jun. 12, 2020

(65) Prior Publication Data

US 2021/0008948 A1 Jan. 14, 2021

Related U.S. Application Data

(60) Provisional application No. 62/968,661, filed on Jan. 31, 2020, provisional application No. 62/872,543, filed on Jul. 10, 2019, provisional application No. 62/872,437, filed on Jul. 10, 2019.

(51) Int. Cl.
*B60G 17/052* (2006.01)
*F16F 9/05* (2006.01)
*B60G 15/12* (2006.01)

(52) U.S. Cl.
CPC ......... *B60G 17/0521* (2013.01); *B60G 15/12* (2013.01); *F16F 9/057* (2013.01); *B60G 2202/152* (2013.01)

(58) Field of Classification Search
CPC ............... B60G 17/0521; B60G 15/12; B60G 2202/152; F16F 9/057; F16F 9/05; F16F 9/084; F16F 9/38; F16F 9/04; F16F 9/049
See application file for complete search history.

(56) References Cited

U.S. PATENT DOCUMENTS

| | | | | |
|---|---|---|---|---|
| 3,145,985 A | * | 8/1964 | Bourcier | B60G 17/048 280/5.514 |
| 4,722,516 A | * | 2/1988 | Gregg | F16F 9/38 267/64.27 |
| 4,934,667 A | * | 6/1990 | Pees | F16F 9/084 188/322.18 |
| 5,667,203 A | * | 9/1997 | Romer | F16F 9/36 267/64.23 |
| 9,707,817 B1 | * | 7/2017 | Arnott | F16F 9/05 |
| 9,708,028 B1 | * | 7/2017 | Arnott | B60G 17/0272 |
| 9,713,945 B1 | * | 7/2017 | Arnott | F16F 9/084 |
| 9,714,066 B1 | * | 7/2017 | Arnott | B62K 11/04 |
| 2002/0121413 A1 | * | 9/2002 | Jurrens | B60G 15/14 188/266 |

(Continued)

FOREIGN PATENT DOCUMENTS

| DE | 102017217041 A1 | * | 3/2019 | |
| EP | 3594528 A1 | * | 1/2020 | B60G 15/14 |

*Primary Examiner* — Paul N Dickson
*Assistant Examiner* — Kurtis Nielson
(74) *Attorney, Agent, or Firm* — Barnes & Thornburg LLP; Mark J. Nahnsen

(57) ABSTRACT

A spring-damper assembly includes a damper and an adjustable gas spring system coupled to the damper. The spring-damper assembly can be coupled to a vehicle as part of a suspension thereof. The adjustable gas spring system maintains the ride height of the vehicle while absorbing forces from changes in the terrain. The dampers control unwanted movement of the coil spring and dissipate forces from the suspension.

24 Claims, 21 Drawing Sheets

(56) References Cited

U.S. PATENT DOCUMENTS

| | | | |
|---|---|---|---|
| 2003/0173723 A1* | 9/2003 | Behmenburg | F16F 9/0472 |
| | | | 267/122 |
| 2010/0025946 A1* | 2/2010 | Inoue | B60G 17/0521 |
| | | | 280/6.157 |
| 2014/0175716 A1* | 6/2014 | Sugata | F16F 9/088 |
| | | | 267/64.24 |
| 2015/0159725 A1* | 6/2015 | Gleu | F16F 9/05 |
| | | | 267/64.24 |
| 2016/0096585 A1* | 4/2016 | Awasa | B60C 15/06 |
| | | | 267/220 |
| 2017/0219041 A1* | 8/2017 | Debruler | F16F 9/057 |
| 2017/0274959 A1* | 9/2017 | Yoshida | F16F 9/346 |
| 2017/0284493 A1* | 10/2017 | Smith | F16F 9/05 |
| 2018/0194189 A1* | 7/2018 | Suissa | B60G 15/12 |
| 2019/0346005 A1* | 11/2019 | Tanaka | F16F 9/055 |
| 2019/0359024 A1* | 11/2019 | Weber | B60G 15/12 |
| 2020/0171907 A1* | 6/2020 | Hall | B60G 11/27 |
| 2020/0180006 A1* | 6/2020 | Jerisk | B60G 15/14 |
| 2021/0062886 A1* | 3/2021 | Marchel | F16F 9/38 |

* cited by examiner

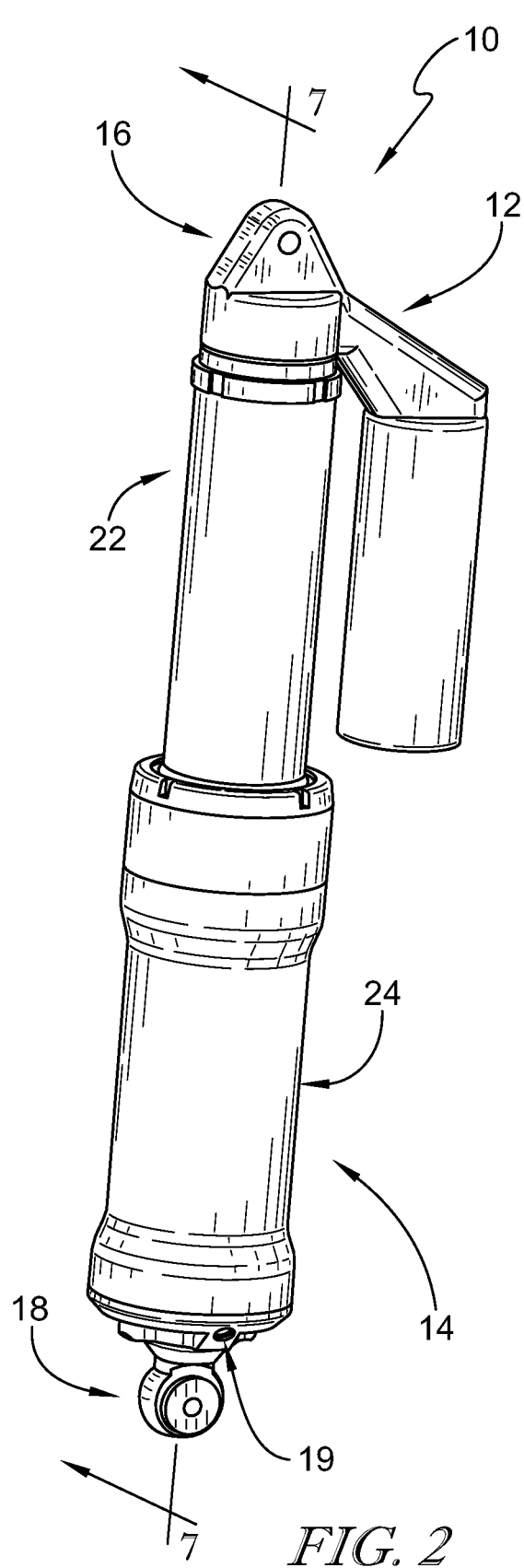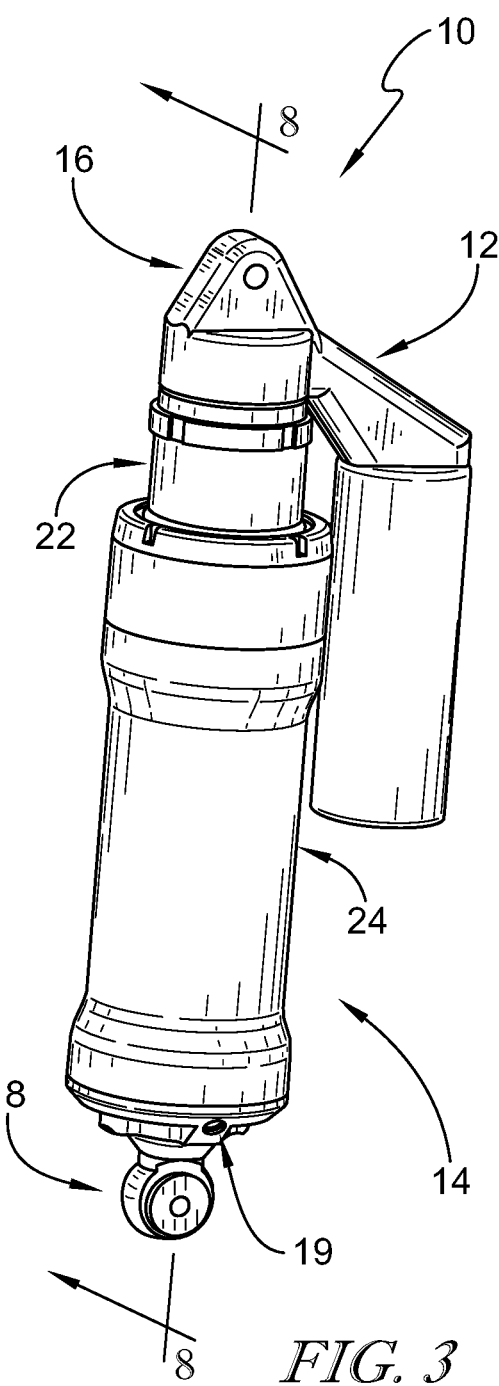
FIG. 2
FIG. 3

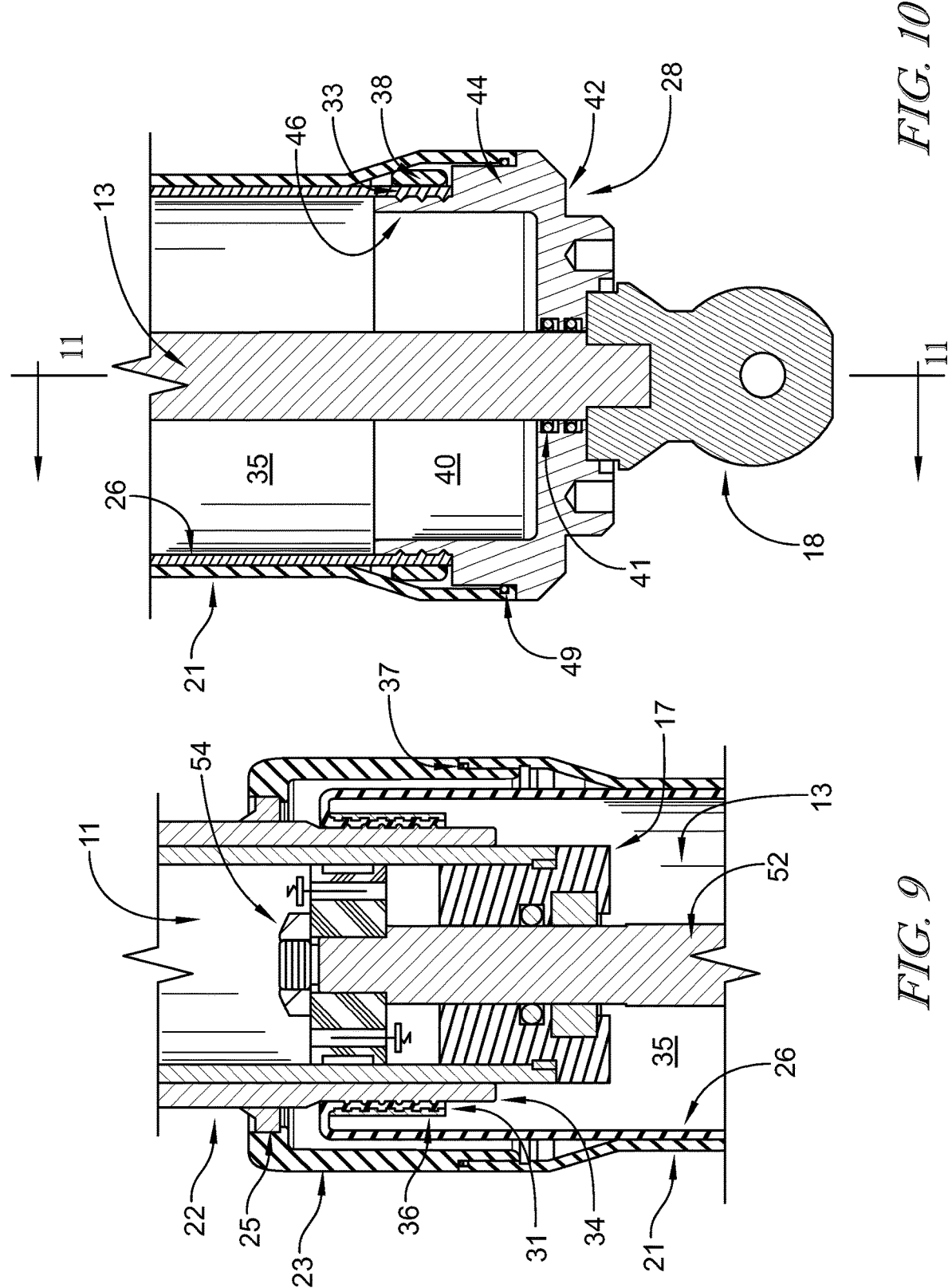

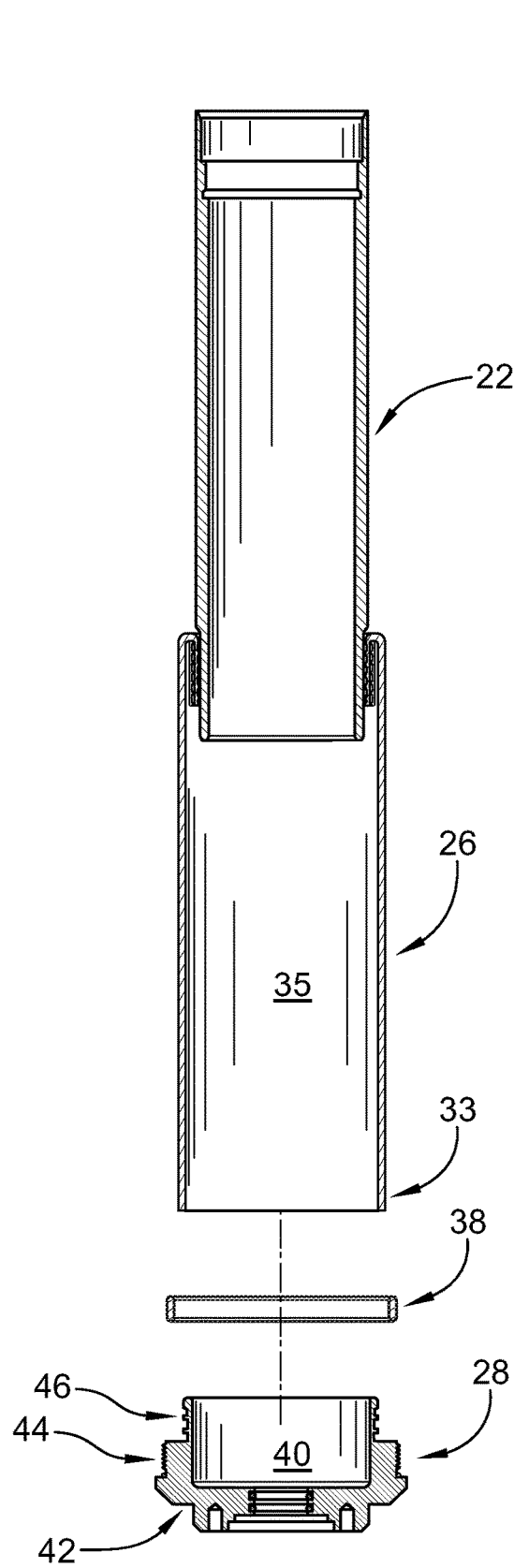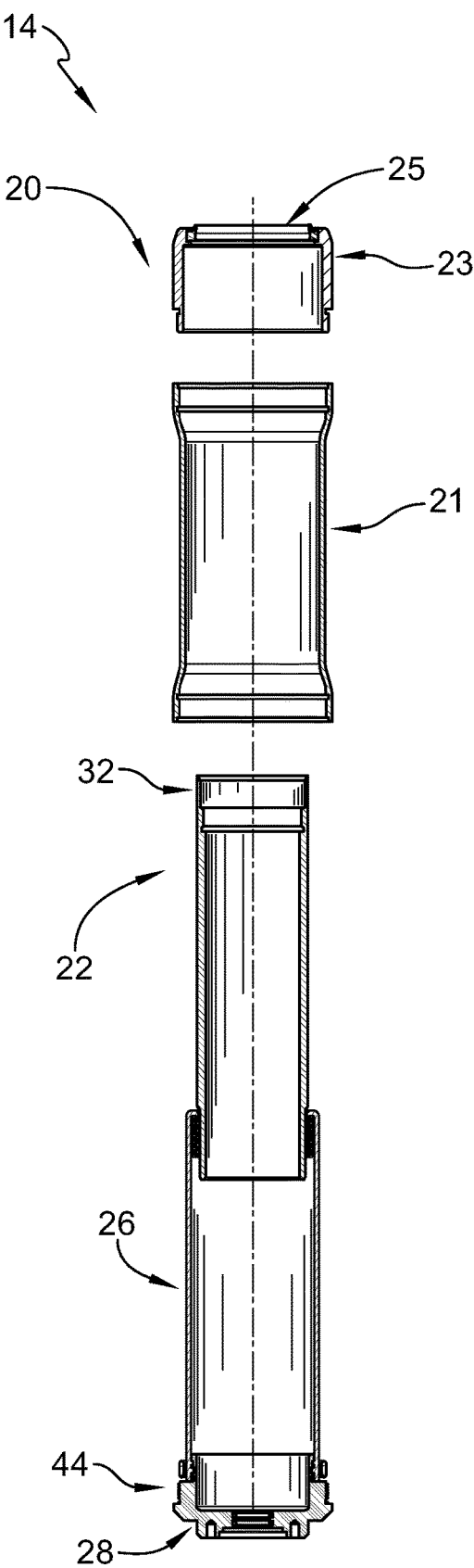
FIG. 15
FIG. 16

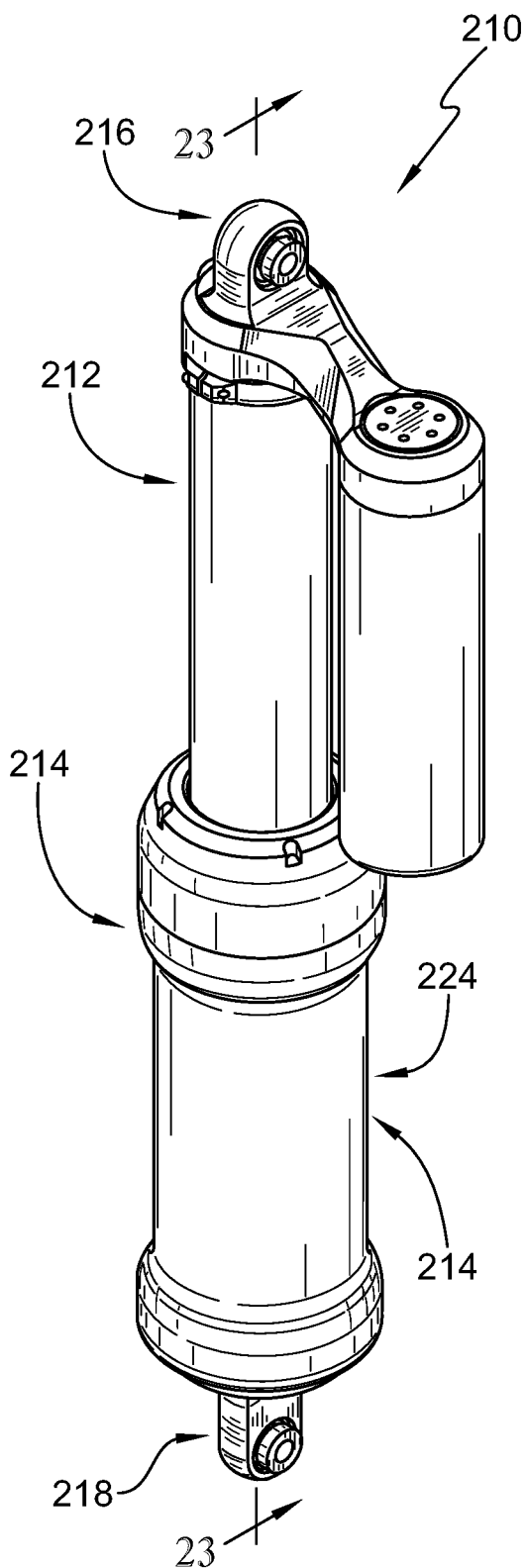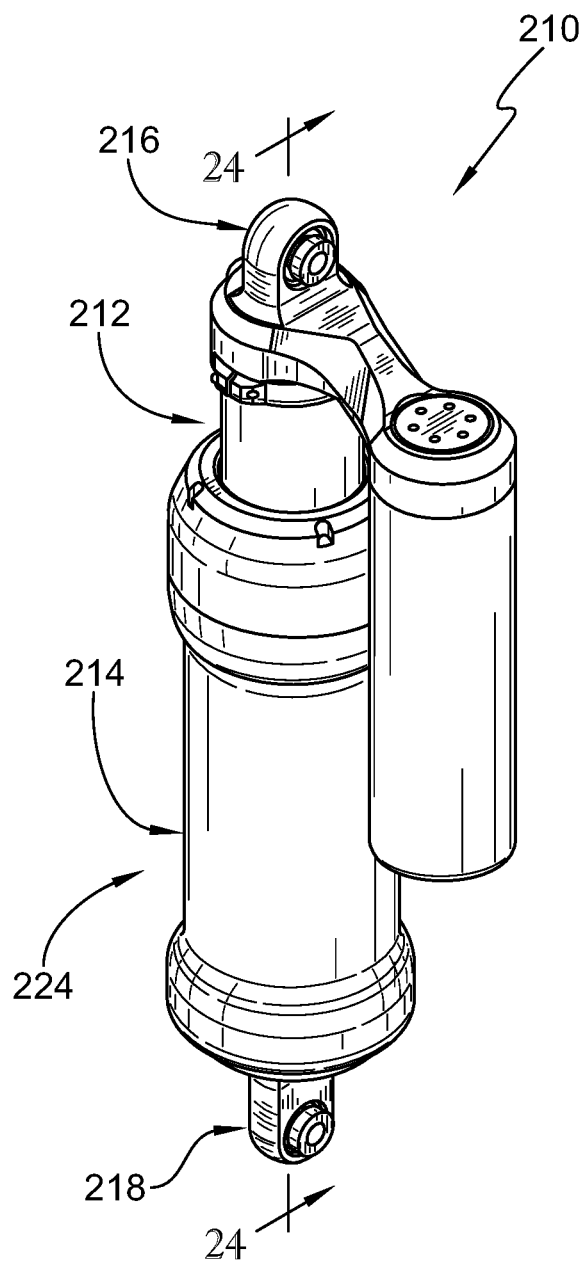
FIG. 21
FIG. 22

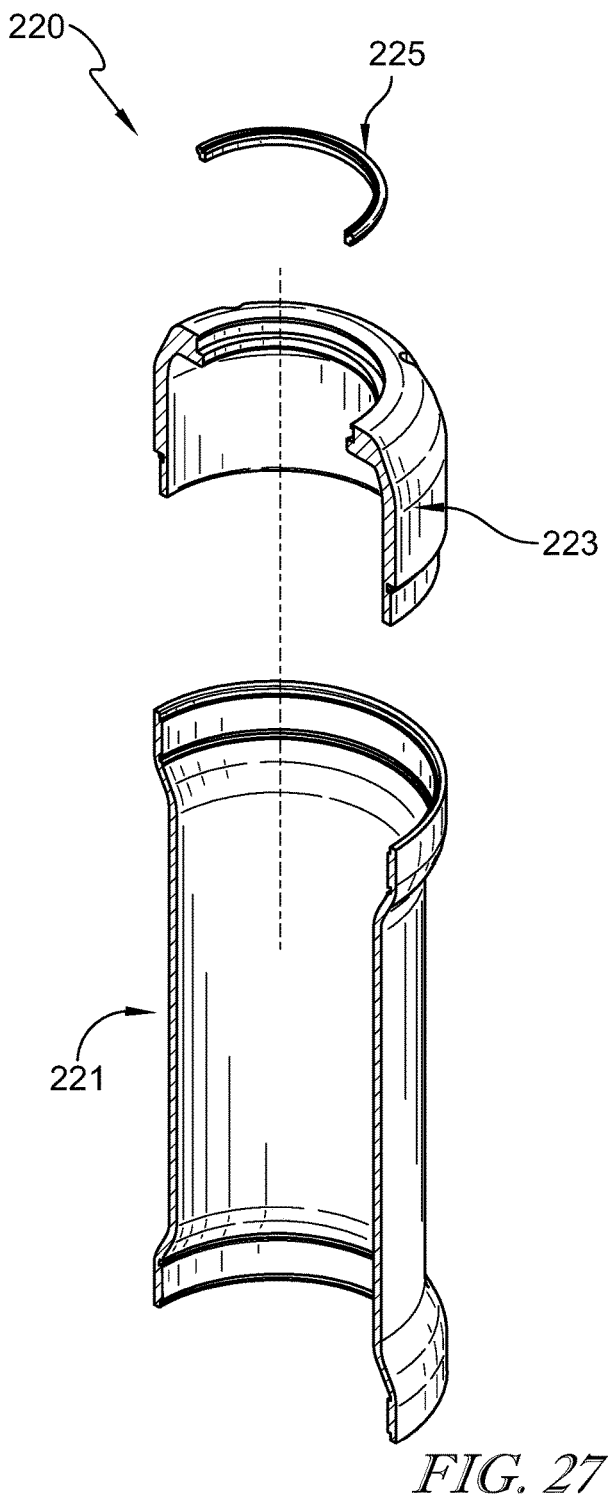
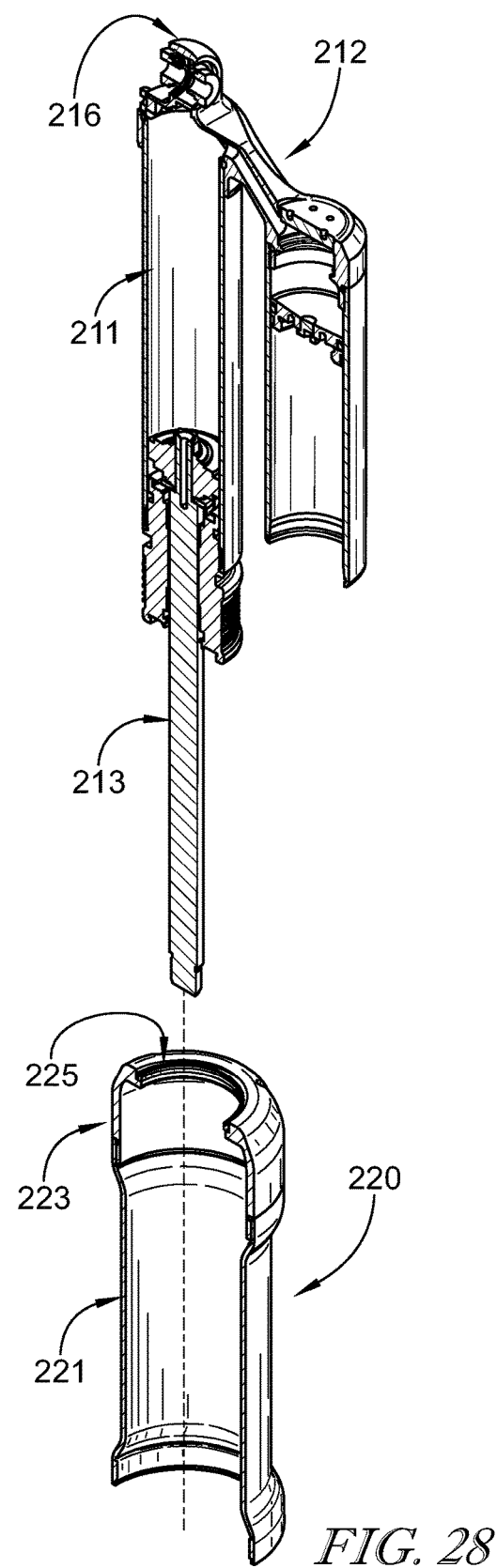
FIG. 27
FIG. 28

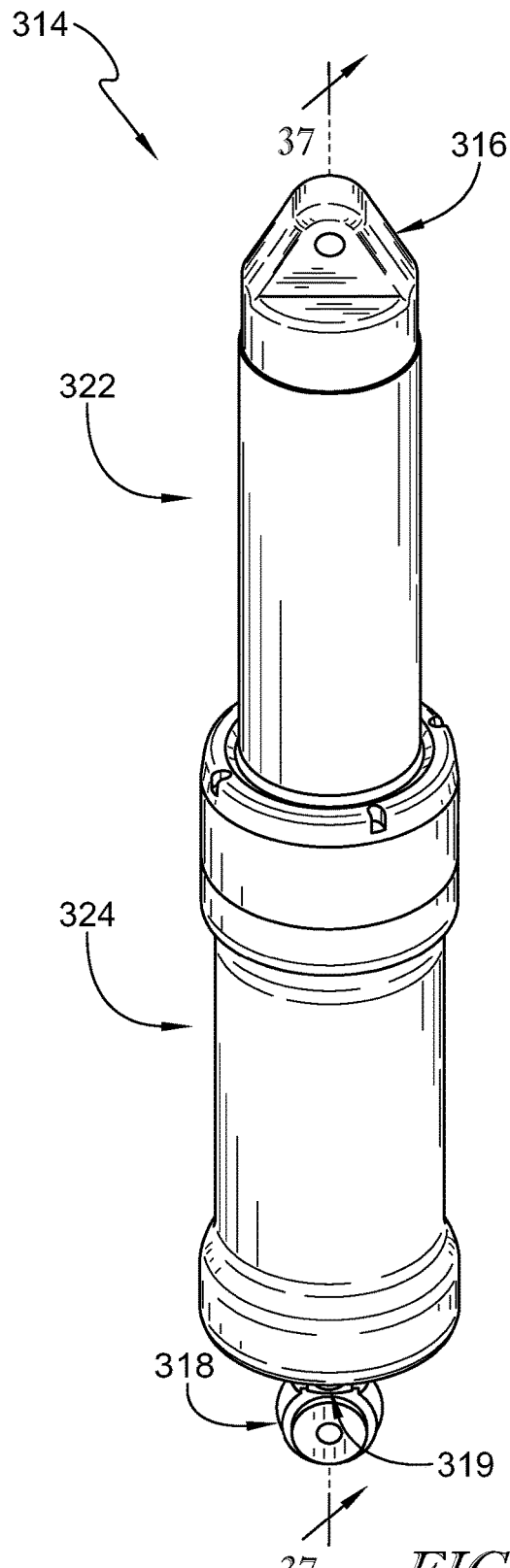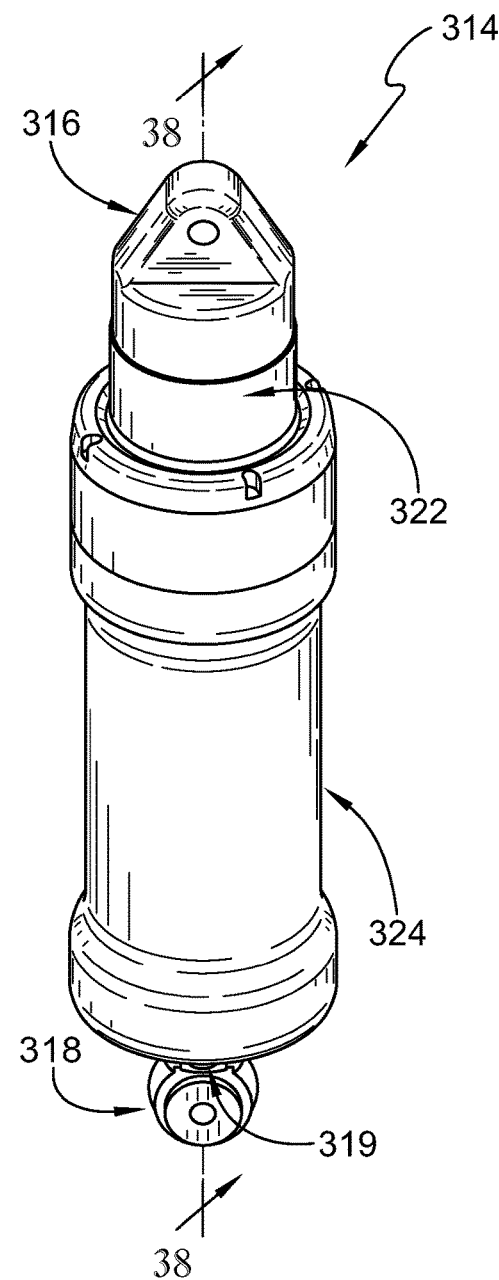
FIG. 35
FIG. 36

ADJUSTABLE GAS SPRING SYSTEM

CROSS-REFERENCE TO RELATED APPLICATIONS

The present application claims priority under 35 U.S.C. § 119(e) to U.S. Provisional Patent Application Ser. No. 62/872,437, filed on Jul. 10, 2019, U.S. Provisional Patent Application Ser. No. 62/872,543, filed on Jul. 10, 2019, and U.S. Provisional Patent Application Ser. No. 62/968,661, filed on Jan. 31, 2020, the disclosures of which are hereby incorporated by reference herein in their entireties.

FIELD OF THE DISCLOSURE

The present disclosure relates generally to gas springs, and specifically to adjustable gas springs. More specifically, the present disclosure relates to an adjustable gas spring for use in a vehicle suspension.

BACKGROUND

A vehicle suspension may include a metal coil spring and associated damper (sometimes called a strut or shock) arranged at each wheel. The coil springs maintain the ride height of the vehicle while absorbing forces from changes in the terrain. The dampers control unwanted movement of the coil spring and dissipate forces from the suspension.

Some suspensions are adjustable to provide different forces on the wheels and ride heights for the vehicle. Gas springs can be used to provide adjustability to the suspension of a vehicle. However, dirt and other debris can affect the performance and longevity of gas springs, making their use on vehicles limited. Accordingly, there is a need for an improved gas spring for use in a vehicle suspension.

This background information is merely for context and no admission is intended, nor should such admission be inferred or construed, that any of the preceding information constitutes prior art against the present disclosure.

SUMMARY

According to embodiments of the present disclosure, an adjustable gas spring system is adapted for use with a vehicle to support the vehicle and control movement of wheels of the vehicle relative to its frame.

In illustrative embodiments, the adjustable gas spring system is adapted to be coupled to a damper to form a spring-damper assembly. The spring-damper assembly is adapted to be movable between an extended position and a retracted position in response to changes in terrain. Pressure within the gas spring system can be adjusted to increase or decrease ride height or load capacity of the vehicle.

In illustrative embodiments, the adjustable gas spring system includes a tube arranged to be coupled with a cylinder of the damper and is provided with a gas spring coupled to the tube for movement relative to the tube. A piston assembly of the damper extends through the tube and is coupled with the enclosed gas spring for movement with the enclosed gas spring relative to the tube and cylinder. The gas spring illustratively includes a rolling diaphragm and a housing surrounding the rolling diaphragm. The rolling diaphragm acts as a pressure vessel having a variable volume and a flexible sidewall.

In illustrative embodiments, the adjustable gas spring system includes a housing configured to provide a sealed environment for blocking dirt and other debris from entering the enclosed gas spring to protect the rolling diaphragm from contamination. The housing includes an endcap, a sleeve coupled to the endcap, a cover coupled to the sleeve, and a seal member coupled to the cover.

In illustrative embodiments the rolling diaphragm is coupled to the tube with a first clamp and to the endcap with a second clamp. The rolling diaphragm extends between a first end and an opposite second end, and defines an interior space. The first end of the rolling diaphragm engages with and seals against the second end of the tube and is held in place by the first clamp. The second end of the rolling diaphragm engages with and seals against the rim wall and is held in place by the second clamp.

BRIEF DESCRIPTION OF THE DRAWINGS

The present disclosure will be described hereafter with reference to the attached drawings, given as a non-limiting example only, in which:

FIG. 2 is a perspective view of an embodiment of a spring-damper assembly in accordance with the present disclosure showing that the spring-damper assembly includes a damper and an adjustable gas spring system coupled to the damper and suggesting that the spring-damper assembly is movable between an extended position, shown in FIG. 2, and a retracted position, shown in FIG. 3;

FIG. 3 is a view similar to FIG. 2 showing the spring-damper assembly in the retracted position;

FIG. 9 is an enlarged view of the spring-damper assembly of FIG. 7 showing that the housing surrounds the rolling diaphragm and the seal member engages with the housing and tube to block debris from entering the housing;

FIG. 10 is an enlarged view of the spring-damper assembly of FIG. 7 showing that the piston assembly of the damper extends into the endcap and suggesting that the endcap and piston assembly move with one another relative to the tube and cylinder;

FIGS. 13-18 are a series of views illustrating an exemplary process for assembling the spring-damper assembly of FIG. 7;

FIG. 21 is a perspective view of another embodiment of a spring-damper assembly in accordance with the present disclosure showing that the spring-damper assembly includes a damper and an adjustable gas spring system coupled to the damper and suggesting that the spring-damper assembly is movable between an extended position, shown in FIG. 21, and a retracted position, shown in FIG. 22;

FIG. 22 is a view similar to FIG. 21 showing the spring-damper assembly in the retracted position;

FIGS. 27-34 are a series of views illustrating an exemplary process for assembling the spring-damper assembly of FIG. 23, FIG. 35 is a perspective view of an embodiment of an adjustable gas spring system in accordance with the present disclosure showing that the adjustable gas spring system includes a tube and an enclosed gas spring coupled to the tube for movement relative to the tube and suggesting that the adjustable gas spring system is movable between an extended position, shown in FIG. 35, and a retracted position, shown in FIG. 36;

FIG. 36 is a view similar to FIG. 35 showing the adjustable gas spring system in the retracted position;

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying modes of carrying out the disclosure as presently perceived.

DETAILED DESCRIPTION

Figure 1:
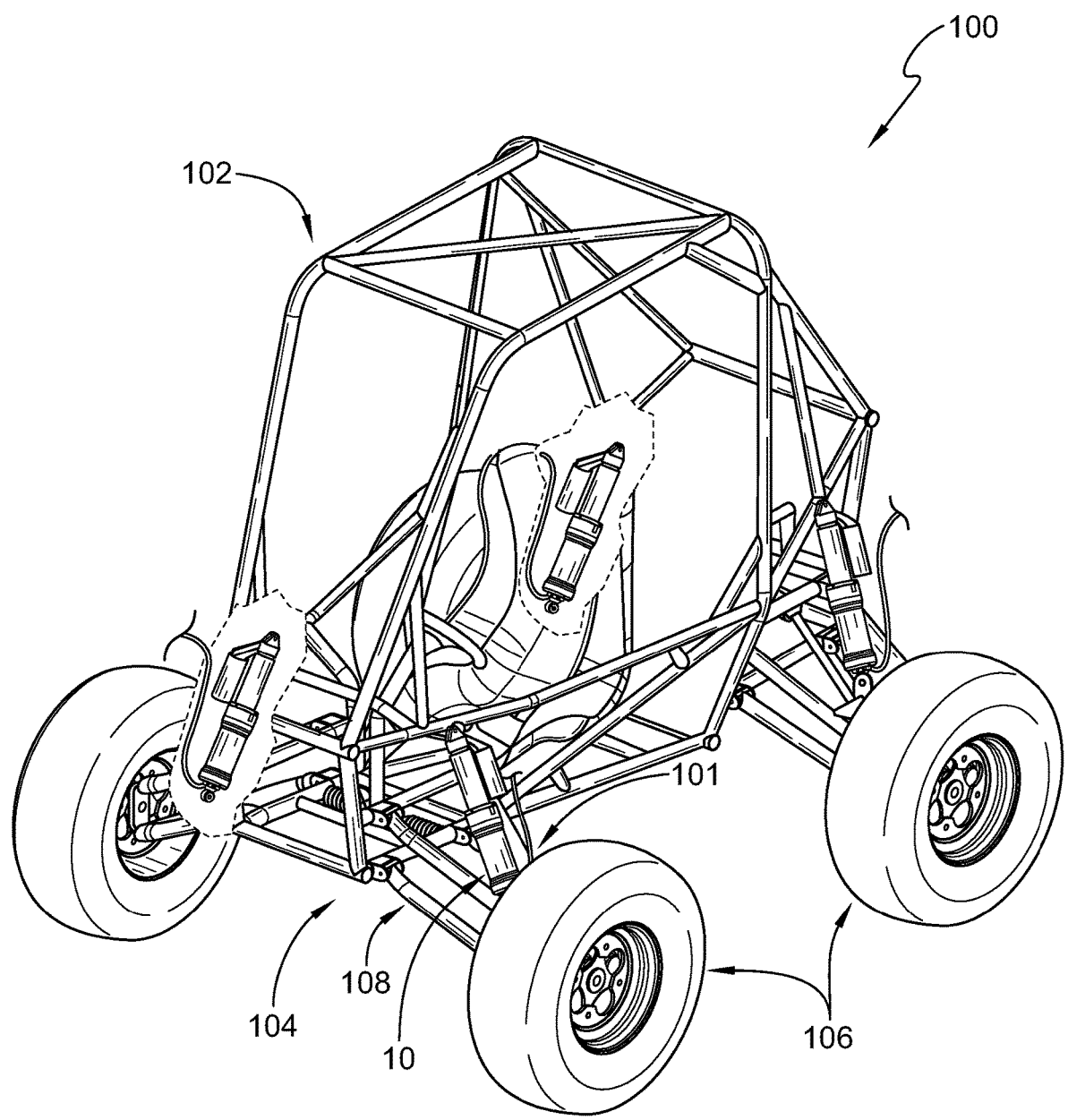
FIG. 1 is a perspective view of a vehicle showing that the vehicle includes a frame, wheels, and a suspension connecting the wheels to the frame and suggesting that spring-damper assemblies in accordance with the present disclosure are arranged in the suspension to control movement of the wheels relative to the frame.
Figure 4:
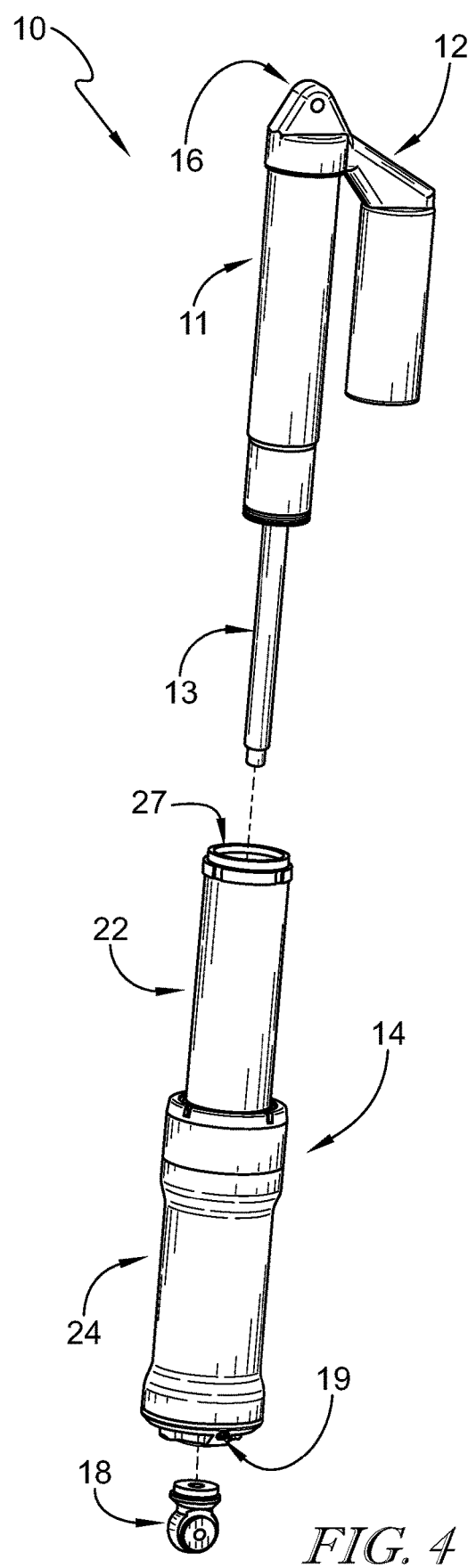
FIG. 4 is a perspective exploded assembly view of the spring-damper assembly of FIG. 2 showing that the adjustable gas spring system includes a tube arranged to be coupled with a cylinder of the damper and an enclosed gas spring coupled to the tube for movement relative to the tube and suggesting that a piston assembly of the damper extends through the tube to couple with the enclosed gas spring for movement with the enclosed gas spring relative to the tube and cylinder.

As shown in FIG. 1, an exemplary vehicle 100 includes a chassis or frame 102 and a suspension 104 for coupling wheels 106 to the frame 102. Spring-damper assemblies 10 in accordance with the present disclosure are arranged in the suspension 104 for controlling movement of the wheels 106 relative to the frame 102. Pivotable control arms 108 of the suspension 104 are coupled between the frame 102 and the wheels 106 to allow movement of the wheels 106 relative to the frame 102. The spring-damper assemblies 10 are configured to engage with the frame 102 and control arms 108 to bias the control arms 108 and attached wheels 106 away from the frame 102 for maintaining the ride height of the vehicle 100 While absorbing forces from imperfections in the terrain. In some embodiments, the spring-damper assemblies 10 are configured to engage with other portions of the suspension 104, such as wheel hubs, axles, etc. The spring-damper assemblies 10 are also configured to control movement of the control arms 108 relative to the frame 102 and dissipate forces from the suspension 104 for smoothing the ride feel of the driver and passengers of the vehicle 100. Control lines 101 coupled to the spring-damper assemblies 10 allow adjustment of characteristics of the spring-damper assemblies 10 and/or configuration of the suspension 104, such as ride height for the vehicle 100.

In the illustrative embodiment, as shown in FIGS. 2 and 3, an exemplary spring-damper assembly 10 includes a damper 12 and an adjustable gas spring system 14 coupled to the damper 12. First and second mounts 16, 18 are arranged at opposing ends of the spring-damper assembly 10 for attachment of the spring-damper assembly 10 to the frame 102 and suspension 104 of the vehicle 100. The spring-damper assembly 10 is movable between an extended position, shown in FIG. 2, and a retracted position, shown in FIG. 3. A port 19 allows attachment of the control line 101 to the adjustable gas spring system 14 for controllable adjustment of the spring-damper assembly 10 between the extended and retracted positions. In some embodiments, the control line 101 can be coupled to an automatic or manual pump for increasing pressure in the adjustable gas spring system 14 to move the spring-damper assembly 10 toward the extended position to provide an increased ride height for the vehicle 100, for example. Pressure in the adjustable gas spring system 14 can also be decreased to move the spring-damper assembly 10 toward the retracted position under the weight of the vehicle 100 on the suspension 104.

As shown in FIGS. 2-5, the adjustable gas spring system 14 includes a tube 22 arranged to be coupled with a cylinder 11 of the damper 12 and an enclosed gas spring 24 coupled to the tube 22 for movement relative to the tube 22. A piston assembly 13 of the damper 12 extends through the tube 22 to couple with the enclosed gas spring 24 for movement with the enclosed gas spring 24 relative to the tube 22 and cylinder 11. In the illustrative embodiment, the adjustable gas spring system 14 is configured to provide a sealed environment for blocking dirt and other debris from entering the enclosed gas spring 24. A collar 27 is coupled to the tube 22 and the cylinder 11 of the damper 12 to hold the tube 22 on the cylinder 11. In some embodiments, a first set of complementary threads couple the collar 27 to the cylinder 11, and a second set of complementary threads couple the tube 22 to the collar 27. In some embodiments, the collar 27 is a compression collar coupled to the tube 22, such as by use of complementary threads, that engages with the tube 22 and the cylinder 11 to hold the tube 22 on the cylinder 11. In some embodiments, the tube 22 is coupled directly to the cylinder 11, such as by use of complementary threads. In some embodiments, the first mount 16 is formed as part of the damper 12 and the second mount 18 is coupled to a distal end of the piston assembly 13 and is engaged with the enclosed gas spring 24.

Figure 5:
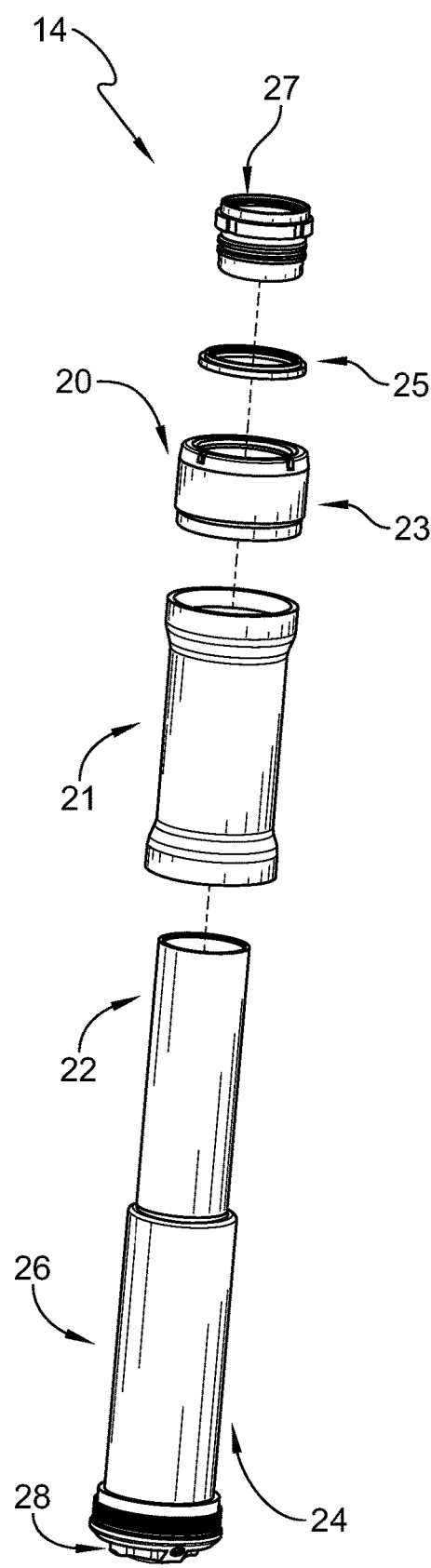
FIG. 5 is a perspective exploded assembly view of the adjustable gas spring system of FIG. 4 showing that the enclosed gas spring includes a rolling diaphragm and a housing surrounding the rolling diaphragm and suggesting that a seal member is coupled to the housing for movement relative to the tube with the housing and arranged to engage with the housing and the tube to provide a seal for blocking debris from entering the housing.

The exemplary enclosed gas spring 24 illustratively includes a rolling diaphragm 26 and a housing 20 surrounding the rolling diaphragm 26 as shown in FIGS. 5 and 7-10. The rolling diaphragm 26 acts as a pressure vessel having a variable volume and a flexible sidewall. The rolling diaphragm 26 moves with reduced friction because movement is made by a rolling action rather than a sliding one. In some embodiments, the diaphragm 26 is formed from a fabric-reinforced molded elastomer or other resilient flexible material, such as elastomers, polymers, or natural or synthetic rubbers. The housing 20 includes an endcap 28, a sleeve 21 coupled to the endcap 28, a cover 23 coupled to the sleeve 21, and a seal member 25 coupled to the cover 23 as shown in FIG. 5. In some embodiments, the sleeve 21 and cover 23 are formed as a unitary and integral structure. In some embodiments, the endcap 28, sleeve 21, and cover 23 are formed from rigid material, such as plastic or metal. The rolling diaphragm 26 is coupled to the tube 22 at one end and to the endcap 28 at an opposite end. In some embodiments, the sleeve 21 is coupled to the endcap 28 by complementary threads. In some embodiments, the cover 23 is coupled to the sleeve 21 by complementary threads. The seal member 25, such as a wiper seal member, is coupled to the housing 20 for movement relative to the tube 22 with the housing 20 and arranged to engage with the housing 20 and the tube 22 to provide a seal for blocking debris from entering the housing 20.

Figure 6:
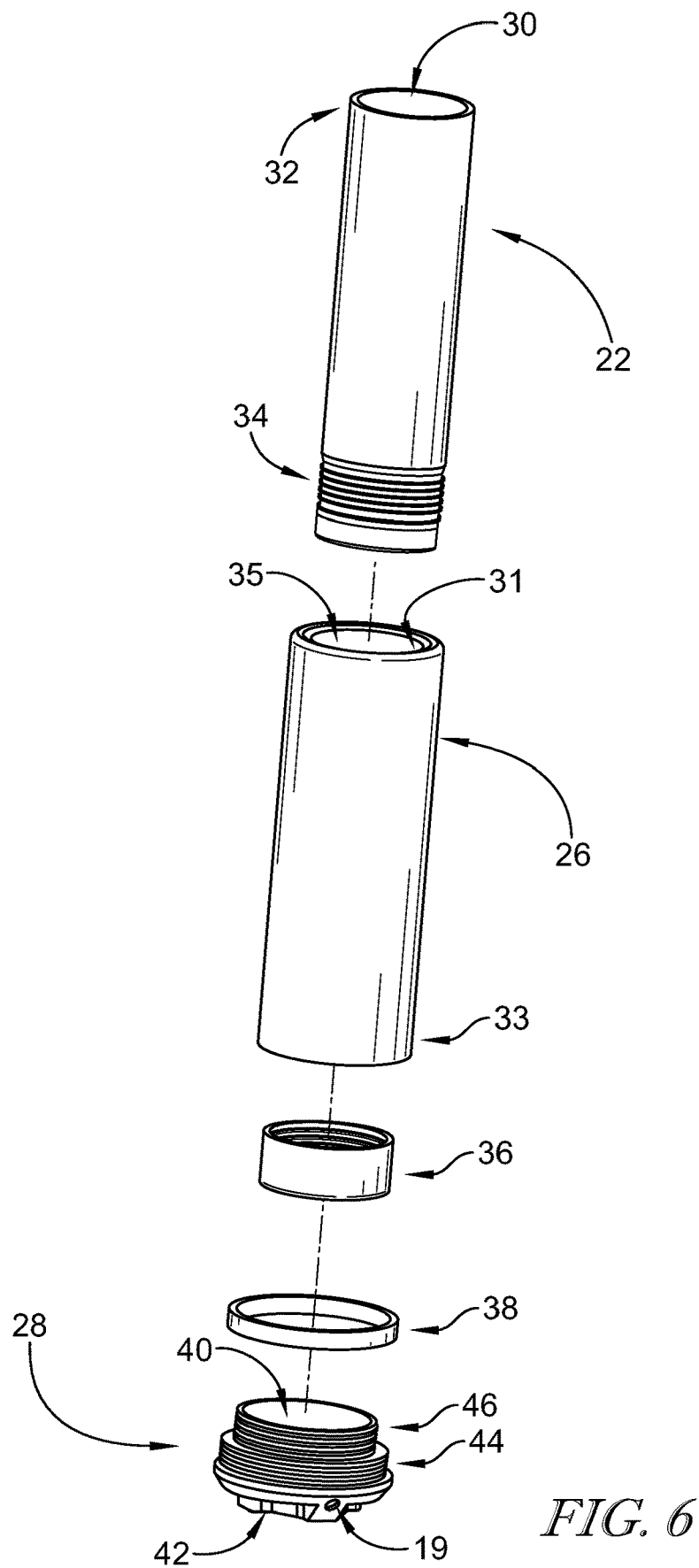
FIG. 6 is a perspective exploded assembly view of the enclosed gas spring of FIG. 5 showing the rolling diaphragm removed from the tube and from an endcap of the housing and suggesting that clamps hold the rolling diaphragm on the endcap and tube.

In the illustrative embodiment, as shown in FIG. 6, the rolling diaphragm 26 is coupled to the tube 22 with a first clamp 36 and to the endcap 28 with a second clamp 38. In some embodiments, the clamps 36, 38 are formed as a band clamp, crimp clamp, or ratchet clamp, among others. In some embodiments, the clamps 36, 38 are formed from a substantially rigid material, such as plastic or metal. The tube 22 extends between a first end 32 and an opposite second end 34, and defines a central bore 30 for receiving the cylinder 11 of the damper 12. The rolling diaphragm 26 extends between a first end 31 and an opposite second end 33, and defines an interior space 35. As shown in FIG. 6, the first end 31 is inverted to extend toward the second end 33. In some embodiments, the first end 31 is not inverted. The endcap 28 includes a base wall 42 (formed to include the port 19), a perimeter wall 44 extending from the base wall 42 for engaging with the housing 20, and a rim wall 46 extending from the perimeter wall 44. The endcap 28 is also formed to define a cavity 40. The first end 31 of the rolling diaphragm 26 engages with and seals against the second end 34 of the tube 22 (held in place by the first clamp 36), and the second end 33 of the rolling diaphragm 26 engages with and seals against the rim wall 46 (held in place by the second clamp 38). In some embodiments, the second end 34 of the tube 22 and the rim wall 46 of the endcap 28 are ribbed to provide additional grip for the rolling diaphragm 26 with the tube 22 and the endcap 28.

Other arrangements for the diaphragm are contemplated by the present disclosure. In various embodiments, the first end 31 is held in a fixed position relative to the cylinder 11 of the damper 12 and the second end 33 is coupled to the housing 20 such that movement of the housing 20 relative to the cylinder 11 moves the first end 31 relative to the second end 33. Pressurization of the interior space 35 of the diaphragm 26, defining at least part of the pressure chamber in the adjustable gas spring system 14, biases the housing 20 away from the cylinder (e.g., away from the first mount 16) and biases the second end 33 of the diaphragm 26 away from the first end 31. In the illustrative embodiment of FIGS. 7 and 8, the tube 22 is fixed in position relative to the cylinder 11, and the first end 31 of the diaphragm 26 is fixed in position on the tube 22. In some embodiments, the tube 22 is omitted, and the first end 31 of the diaphragm 26 is coupled to the damper 12, such as on the cylinder 11. Other arrangements for the housing 20 are also contemplated by the present disclosure. In various embodiments, the housing 2C) is configured to provide a sealed environment around the diaphragm 26 to block dirt and other debris and prevent unwanted contamination. In the illustrative embodiment of FIGS. 7 and 8, the housing 20 surrounds the diaphragm 26 and seals against the tube 22 with the seal member 25 and against the piston assembly 13 with the sealing elements 41. In some embodiments, the second mount 18 is formed as part of the endcap 28 and the sealing elements 41 are omitted.

Figures 7, 8:
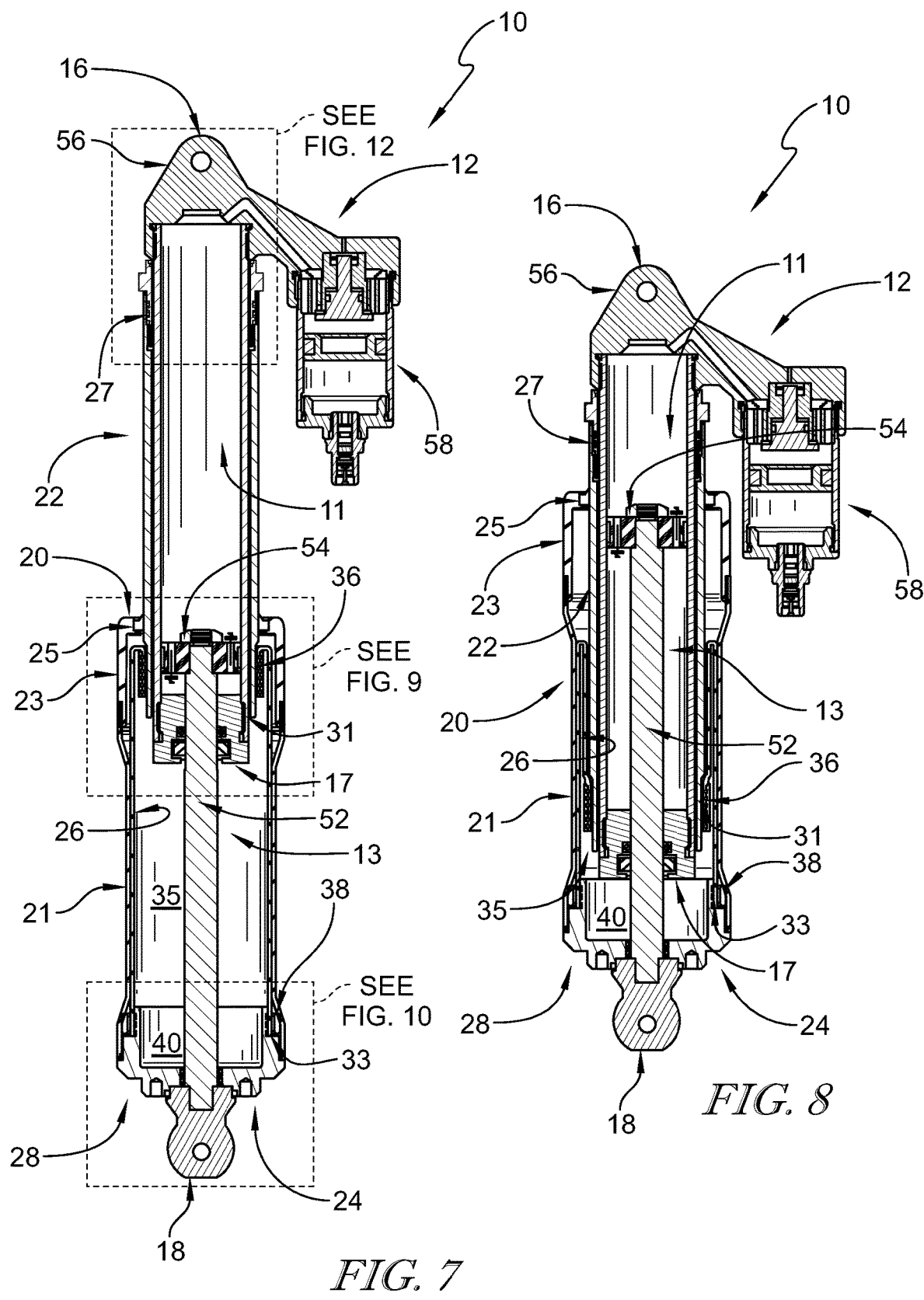
FIG. 7 is a sectional view taken along line 7-7 in FIG. 2 showing that a pressure chamber is defined between the rolling diaphragm, endcap, and tube and suggesting that the pressure chamber can be controllably pressurized for adjusting a spring force provided by the adjustable gas spring system and a length of the spring-damper assembly for adjusting a ride height provided by the spring-damper assembly to the vehicle.
FIG. 8 is a sectional view taken along line 8-8 in FIG. 3.
Figure 11:
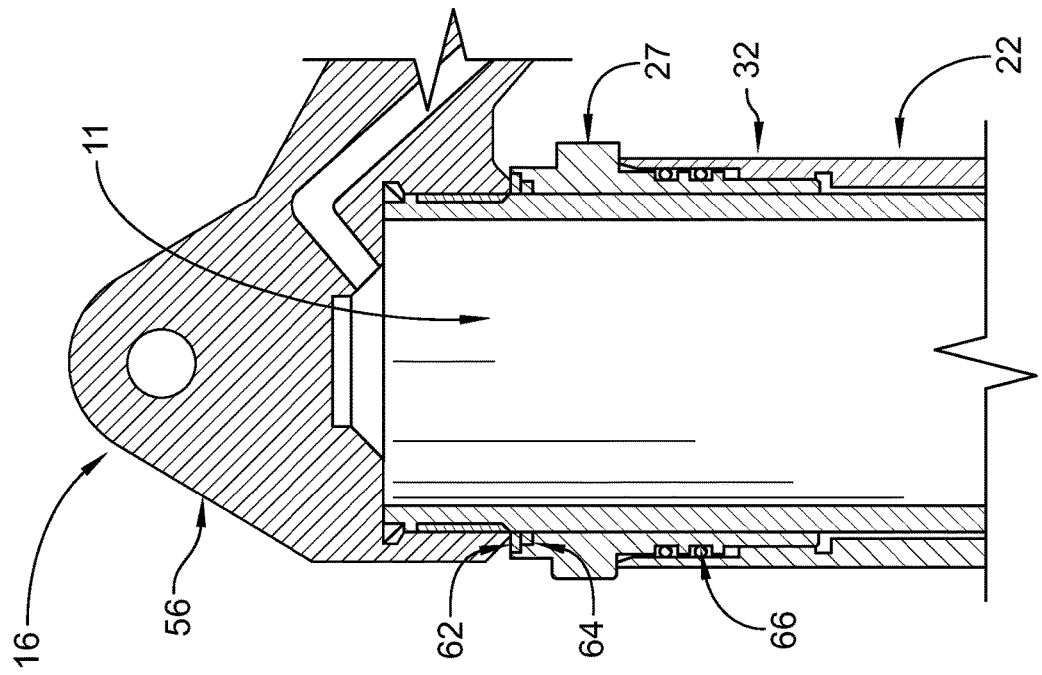
FIG. 11 is a sectional view taken along line 11-11 in FIG. 10 showing that a port is formed through the endcap for allowing pressurized gas to be supplied to or removed from the pressure chamber of the enclosed gas spring.
Figure 12:
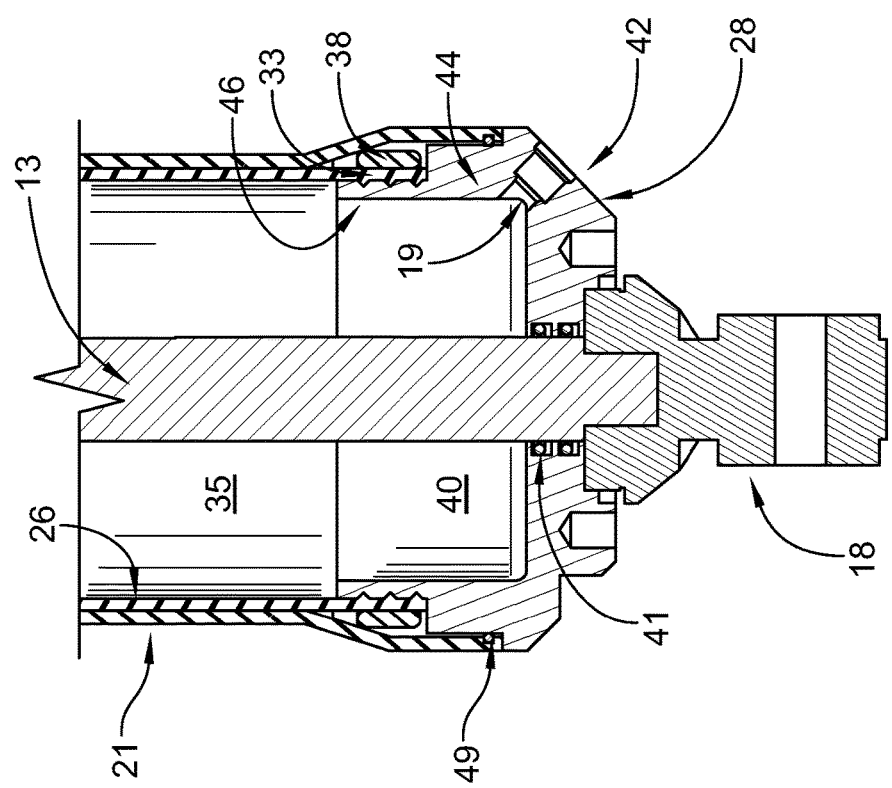
FIG. 12 is an enlarged view of the spring-damper assembly of FIG. 7 showing that a collar coupled to the tube engages with the cylinder of the damper to hold the tube on the cylinder.

As shown in FIGS. 7 and 8, the rolling diaphragm 26 is flexible to allow the first end 31 to move toward the second end 33 and roll along itself during movement of the spring-damper assembly 10 toward the retracted position. The interior space 35 of the rolling diaphragm 26, in combination with the tube 22 and endcap 28, defines a pressure chamber that can be controllably pressurized with gas, such as air, to adjust a spring force provided by the adjustable gas spring system 14 and to adjust a length of the spring-damper assembly 10 to control the ride height of the vehicle 100 provided by the spring-damper assembly 10 in the suspension 104. The port 19 extends through the base wall 42 and into the cavity 40 of the endcap 28 to allow pressurized gas to be supplied to and removed from the interior space 35 of the diaphragm. In some embodiments, the port 19 includes a valve, such as a Schrader valve, for example, to maintain system pressure.

In the illustrative embodiment, as shown in FIGS. 7-12, various sealing elements 37, 41, 49, 64, 66, such as O-rings or other ring seals, are included in the adjustable gas spring system 14 in addition to the seal member 25 to block debris from entering the enclosed gas spring 24. In some embodiments, a backer plate 62 (FIG. 12) is coupled to the cylinder 11, such as by use of complementary threads, and the sealing element 64 is compressed between the backer plate 62 and collar 27 to provide a seal between the collar 27 and the cylinder 11. In some embodiments, the tube 22 is coupled to the cylinder 11 and a sealing element is positioned between the tube 22 and cylinder 11 to provide a seal. In some embodiments, the sealing elements 41, 64, 66 also block pressurized gas from escaping the adjustable gas spring system 14 in combination with the diaphragm 26. Additional or different arrangements of sealing elements are contemplated by the present disclosure. The housing 20 surrounds the diaphragm 26 to provide radial support, to protect against punctures, and to provide a sealed environment for minimizing wear on the diaphragm 26, such as by blocking dirt and other debris from contact with the diaphragm 26.

The adjustable gas spring system 14 is configured to attach to a variety of dampers (such as monotube or twin tube with or without attached reservoirs), and can be used as a retrofit with existing suspension components. The spring-damper assembly 10 can also be provided as a complete replacement for existing suspension components. In the illustrative embodiment of FIGS. 7-12, a cap section 56 of the first mount 16 closes and seals one end of the cylinder 11 of the damper 12, and a plug 17 (sometimes called a seal head or seal carrier) closes and seals an opposite end of the cylinder 11. The piston assembly 13 includes a piston rod 52 and a piston head 54 coupled to the piston rod 52. The piston rod 52 extends through the plug 17 and engages with the second mount 18, such as by use of complementary threads, at an opposite end from the piston head 54. The plug 17 also seals against the piston rod 52. The piston head 54 is configured to allow controlled flow of fluid through the piston head 54 with movement of the piston assembly 13 in the cylinder 11. A fluid reservoir 58 is coupled to the cap section 56 of the first mount 16 and is in fluid communication with the cylinder 11.

In use, the pressure chamber in the enclosed gas spring 24 is pressurized with gas to bias the first and second mounts 16, 18 away from one another as suggested in FIGS. 7 and 8. The pressure in the pressure chamber also biases the spring-damper assembly 10 toward the extended position, and biases the housing 20 and attached piston assembly 13 relative to the cylinder 11. In the retracted position, the spring-damper assembly 10 is shorter, the first and second mounts 16, 18 are arranged closer together, and the first and second ends 31, 33 of the diaphragm 26 are arranged closer together than in the extended position as shown in FIGS. 7 and 8. Forces exerted on the first and second mounts 16, 18, such as during interactions of the wheels 106 with uneven terrain under the vehicle 100, can move the first and second mounts 16, 18 toward one another. The housing 20 moves relative to the tube 22, such as by sliding along the tube 22, with movement of the second mount 18 relative to the first mount 16. The piston assembly 13 also moves relative to the cylinder 11, such as by sliding along the cylinder 11. The first end 31 of the diaphragm 26 moves toward the second end 33, and the pressure in the pressure chamber increases to provide additional biasing force for driving the first and second mounts 16, 18 away from one another in response to the forces on the suspension 104 from the wheels 106. The pressure in the pressure chamber can also be adjusted to change the distance between the first and second mounts 16, 18 for setting a ride height of the vehicle 100 (e.g., with the vehicle 100 in a stationary position).

Figures 13, 14:
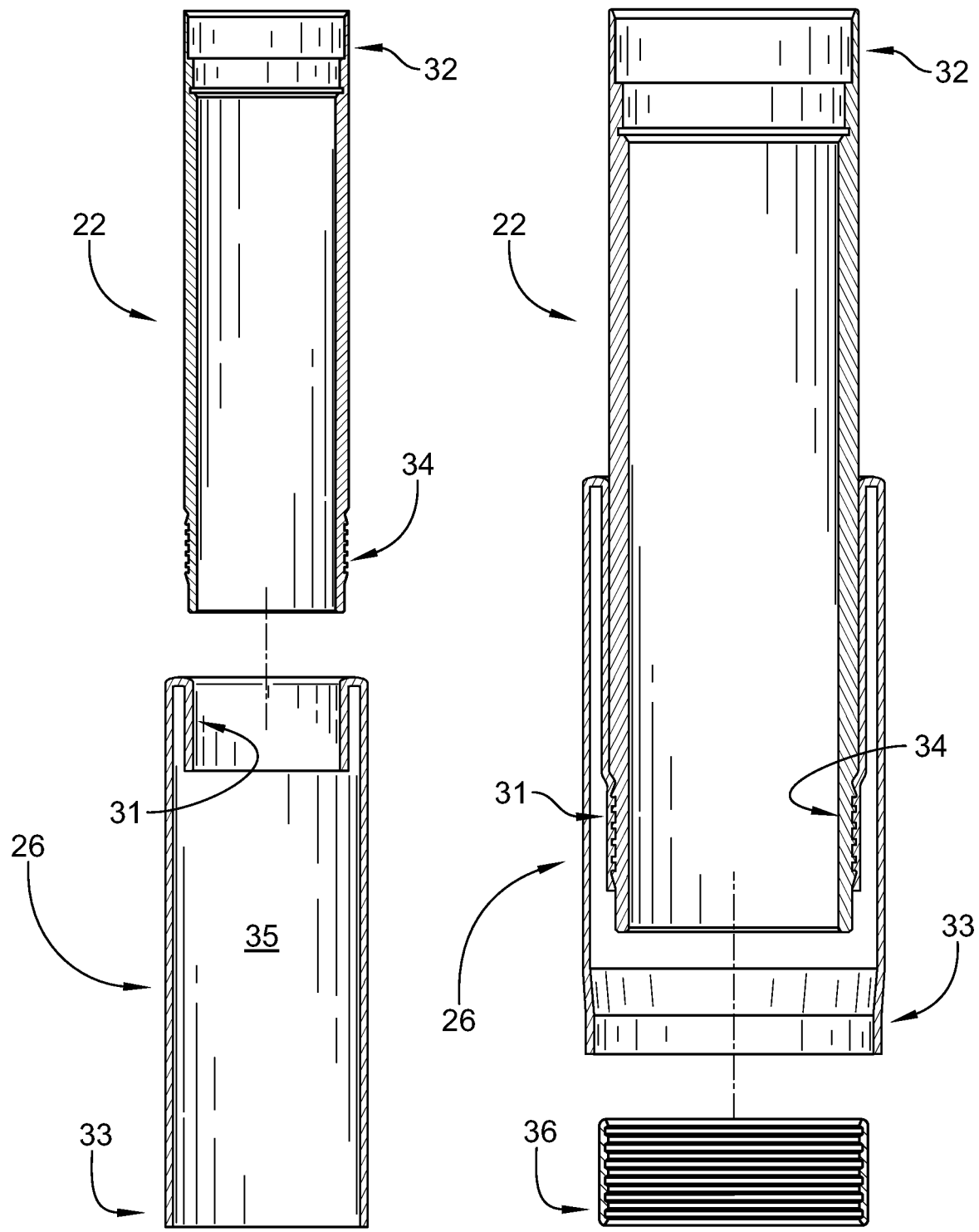
Figure 17:
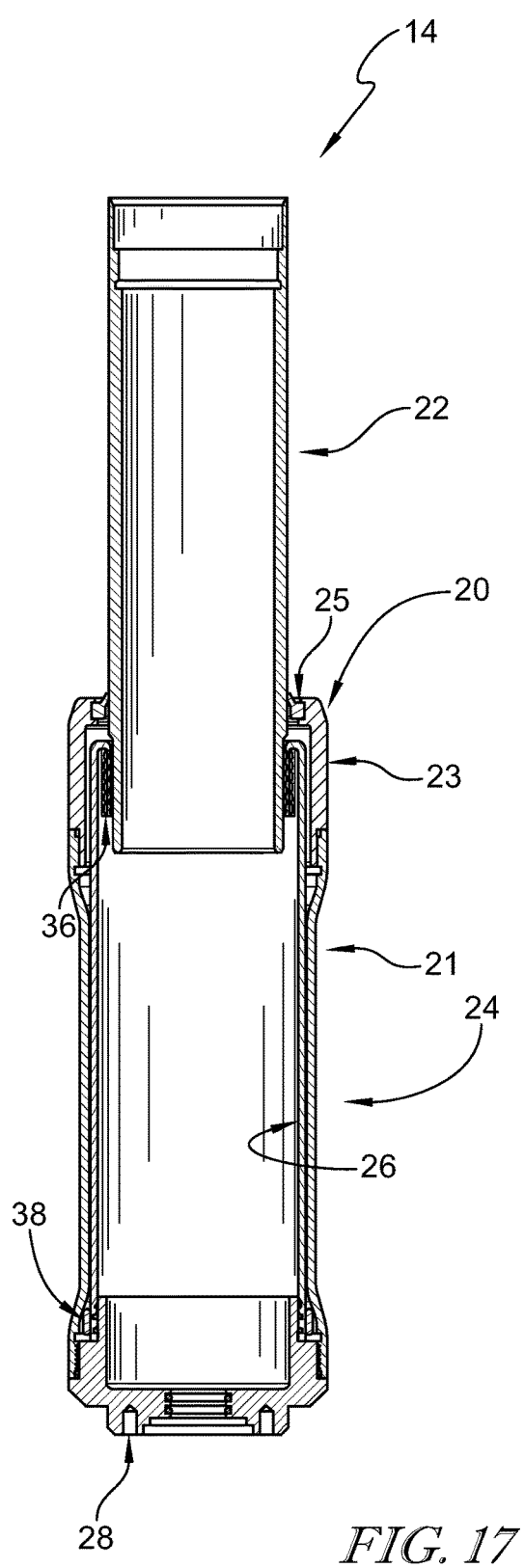
Figure 18:
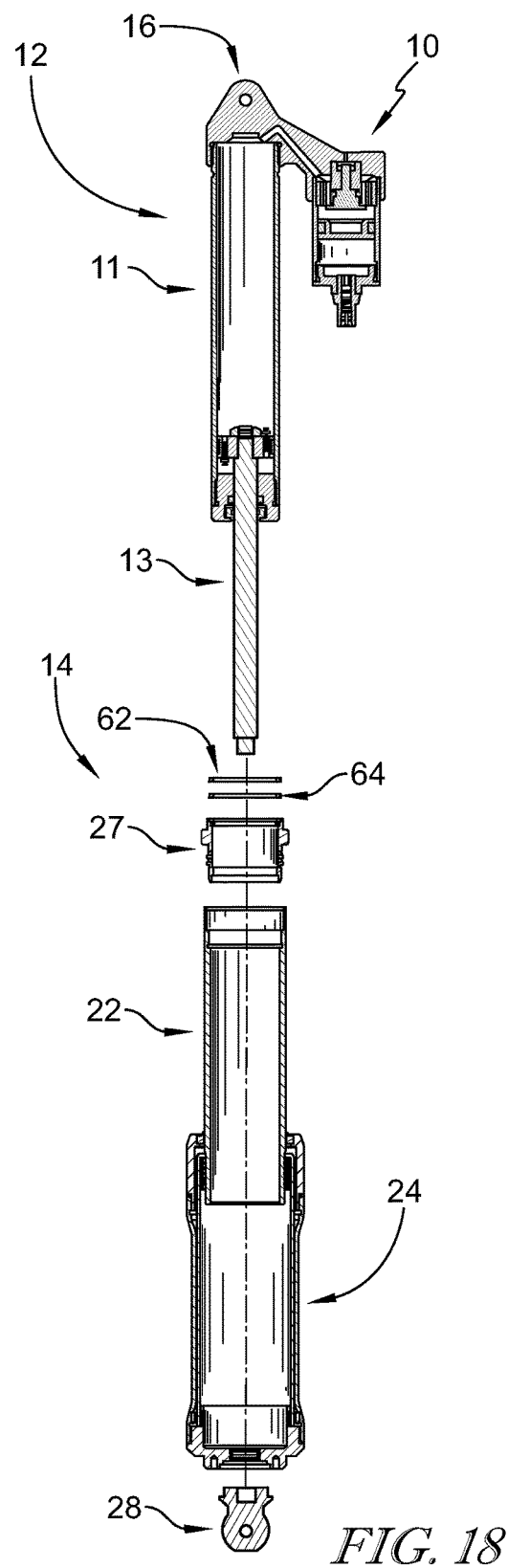

An exemplary process for assembling the spring-damper assembly 10 is illustrated in FIGS. 13-18. The first end 31 of the diaphragm 26 is attached to the second end 34 of the tube 22, and the first clamp 36 is attached over the first end 31 to hold the diaphragm 26 on the tube 22 as shown in FIGS. 13 and 14. The second end 33 of the diaphragm 26 is attached to the rim wall 46 of the endcap 28, and the second clamp 38 is attached over the second end 33 to hold the diaphragm 26 on the endcap 28 as shown in FIG. 15. The cover 23 of the housing 20 is attached to the sleeve 21, and the assembled portion of the housing 20 slides over the tube 22 and diaphragm 26 to attach the sleeve 21 with the perimeter wall 44 of the endcap 28 to form the assembled adjustable gas spring system 14 as shown in FIGS. 16 and 17. The damper 12 is attached to the adjustable gas spring system 14 as shown in FIG. 18. The backer plate 62 is coupled to the cylinder 1 the sealing element 64 extends over the cylinder 11 and is positioned adjacent to the backer plate 62, and the collar 27 is coupled to the cylinder 11 and engages with the sealing element 64. The piston assembly 13 extends through the tube 22 and diaphragm 26, and into the endcap 28, to attach with the second mount 18. The cylinder 11 extends in to the tube 22, and the collar 27 engages with the tube 22 to hold the tube 22 on the cylinder 11. In some embodiments, the collar 27 is sized to block the housing 20 from passing off of the tube 22 at the first end 32. The spring-damper assembly 10 can be disassembled in reverse order, for example. In some embodiments, the adjustable gas spring system 14, including the tube 22, can be removed from the damper 12 and attached to a replacement damper or other damper.

Figure 19:
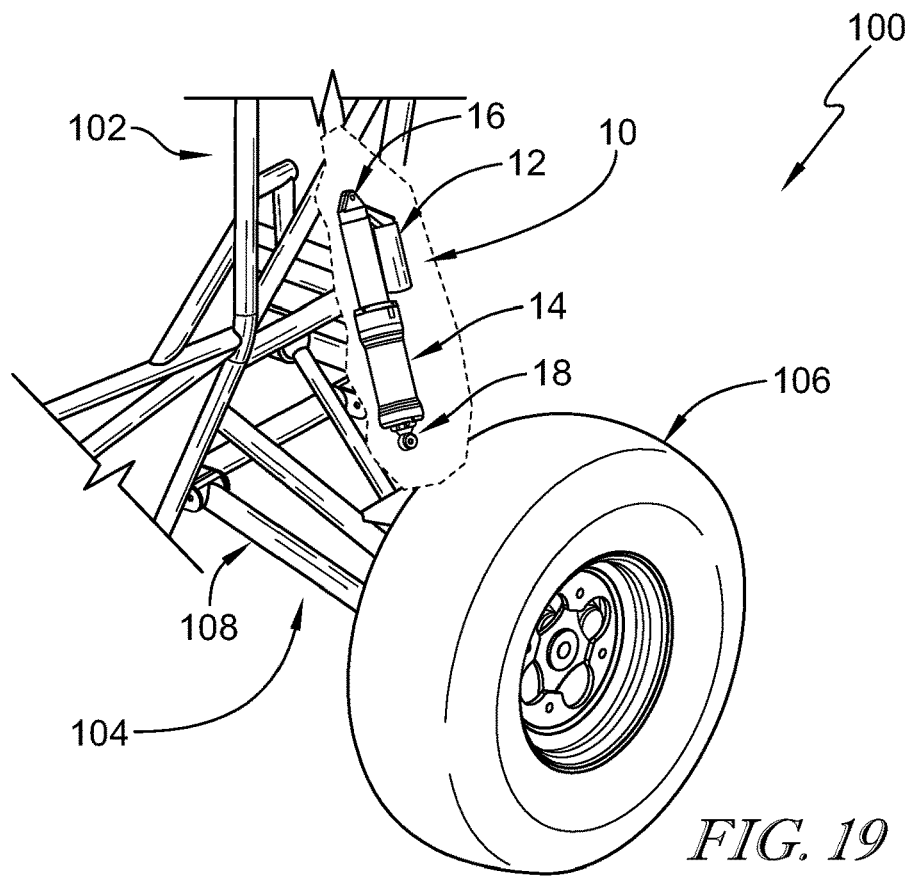
FIG. 19 is an enlarged perspective view of a vehicle showing the spring-damper assembly of FIG. 2 arranged in a suspension of the vehicle in a first configuration.
Figure 20:
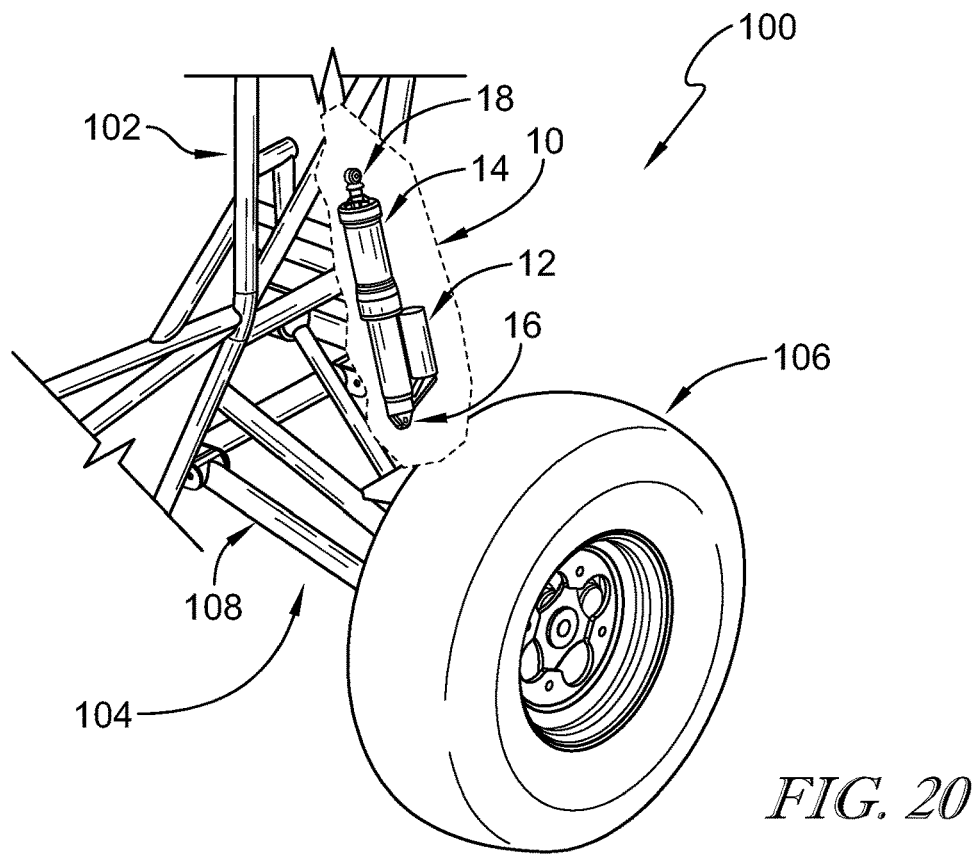
FIG. 20 is a view similar to FIG. 19 showing the spring-damper assembly of FIG. 2 arranged in the suspension of the vehicle in a second configuration.

As shown in FIGS. 19 and 20, the spring-damper assembly 10 can be attached to the vehicle 100 as part of the suspension 104 in a variety of configurations. In one configuration, shown in FIG. 19, the first mount 16 is attached to the frame 102, and the second mount 18 is attached to the control arm 108. In another configuration, shown in FIG. 20, the second mount 18 is attached to the frame 102, and the first mount 16 is attached to the control arm 108. In either configuration, the housing 20 engages with the damper 12 to block debris from contact with the diaphragm 26. Other configurations and attachments for the spring-damper assembly 10 with the vehicle 100 are contemplated by the present disclosure.

Another embodiment of an exemplary spring-damper assembly 210 in accordance with the present disclosure is shown in FIGS. 21 and 22. In the illustrative embodiment, the spring-damper assembly 210 includes a damper 212 and an adjustable gas spring system 214 coupled to the damper 212. First and second mounts 216, 218 are arranged at opposing ends of the spring-damper assembly 210 for attachment of the spring-damper assembly 210 to the frame and suspension of a vehicle, such as the vehicle 100 similar to the spring-damper assembly 10 of FIGS. 1-20. The spring-damper assembly 210 is movable between an extended position, shown in FIG. 21, and a retracted position, shown in FIG. 22. A port 219 allows attachment of a control line to the adjustable gas spring system 214 for controllable adjustment of the spring-damper assembly 210 between the extended and retracted positions. In some embodiments, the control line can be coupled to an automatic or manual pump for increasing pressure in the adjustable gas spring system 214 to move the spring-damper assembly 210 toward the extended position to provide an increased ride height for the vehicle, for example. Pressure in the adjustable gas spring system 214 can also be decreased to move the spring-damper assembly 210 toward the retracted position under the weight of the vehicle on the suspension.

As shown in FIGS. 23-26, an enclosed gas spring 224 of the adjustable gas spring system 214 is arranged for sliding movement along a cylinder 211 of the damper 212 and coupled to a piston assembly 213 of the damper 212 for movement therewith relative to the cylinder 211. In the illustrative embodiment, enclosed gas spring 224 is configured to provide a sealed environment for blocking dirt and other debris from entering the enclosed gas spring 224. In some embodiments, the first mount 218 is formed as part of the damper 212 and the second mount 218 is formed as part of the enclosed gas spring 224.

The exemplary enclosed gas spring 224 illustratively includes a rolling diaphragm 226 and a housing 220 surrounding the rolling diaphragm 226 as shown in FIGS. 23-26. The rolling diaphragm 226 acts as a pressure vessel having a variable volume and a flexible sidewall. The rolling diaphragm 226 moves with reduced friction because movement is made by a rolling action rather than a sliding one. In some embodiments, the diaphragm 226 is formed from a fabric-reinforced molded elastomer or other resilient flexible material, such as elastomers, polymers, or natural or synthetic rubbers. The housing 220 includes an endcap 228, a sleeve 221 coupled to the endcap 228, a cover 223 coupled to the sleeve 221, and a seal member 225 coupled to the cover 223. In some embodiments, the sleeve 221 and cover 223 are formed as a unitary and integral structure. In some embodiments, the endcap 228, sleeve 221, and cover 223 are formed from rigid material, such as plastic or metal. The rolling diaphragm 226 is coupled to a plug 217 (sometimes called a seal head or seal carrier) of the damper 212 at one end and to a fitting 270 coupled to the endcap 228 at an opposite end. In some embodiments, the sleeve 221 is coupled to the endcap 228 by complementary threads. In some embodiments, the cover 223 is coupled to the sleeve 221 by complementary threads. The seal member 225, such as a wiper seal member, is coupled to the housing 220 for movement relative to the cylinder 211 of the damper 212 with the housing 220 and arranged to engage with the housing 220 and the cylinder 211 to provide a seal for blocking debris from entering the housing 220.

The adjustable gas spring system 214 is configured to attach to a variety of dampers (such as monotube or twin tube with or without attached reservoirs) and can be used as a retrofit with existing suspension components. The spring-damper assembly 210 can also be provided as a complete replacement for existing suspension components. In the illustrative embodiment of FIGS. 23-26, a cap section 256 of the first mount 218 closes and seals one end of the cylinder 211 of the damper 212, and the plug 217 closes and seals an opposite end of the cylinder 211. The piston assembly 213 includes a piston rod 252 and a piston head 254 coupled to the piston rod 252. The piston rod 252 extends through the plug 217 and engages with the endcap 228, such as by use of complementary threads, at an opposite end from the piston head 254. The plug 217 also seals against the piston rod 252. The piston assembly 213 is configured to allow controlled flow of fluid around the piston head 254 with movement of the piston assembly 213 in the cylinder 211. A fluid reservoir 258 is coupled to the cap section 256 of the first mount 218 and is in fluid communication with the cylinder 211.

Figures 23, 24:
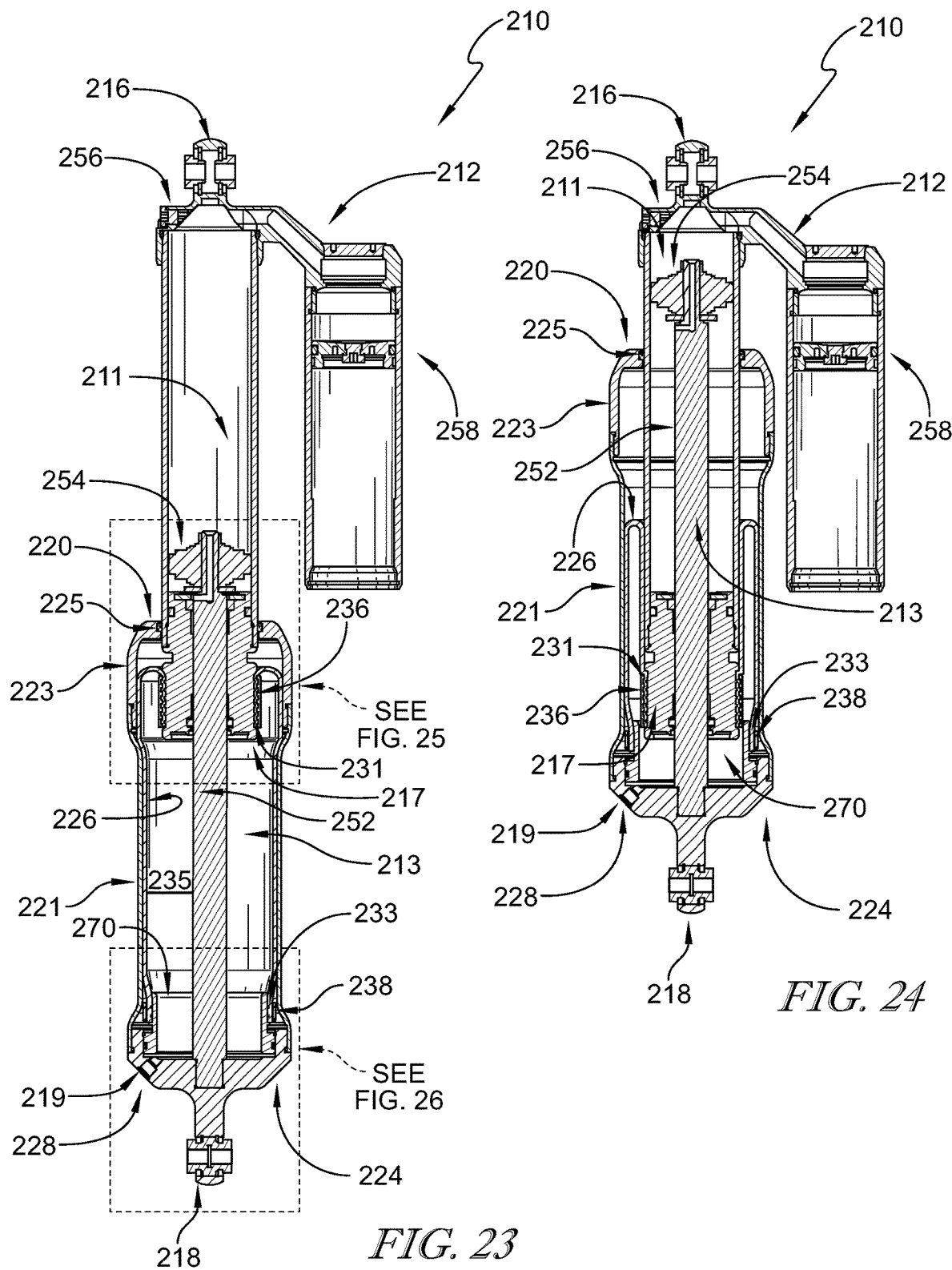
FIG. 23 is a sectional view taken along line 23-23 in FIG. 21 showing that an enclosed gas spring of the adjustable gas spring system includes a rolling diaphragm and a housing surrounding the rolling diaphragm and suggesting that a seal member is coupled to the housing for movement relative to a cylinder of the damper with the housing and arranged to engage with the housing and the cylinder to provide a seal for blocking debris from entering the housing.
FIG. 24 is a sectional view taken along line 24-24 in FIG. 22.
Figure 25:
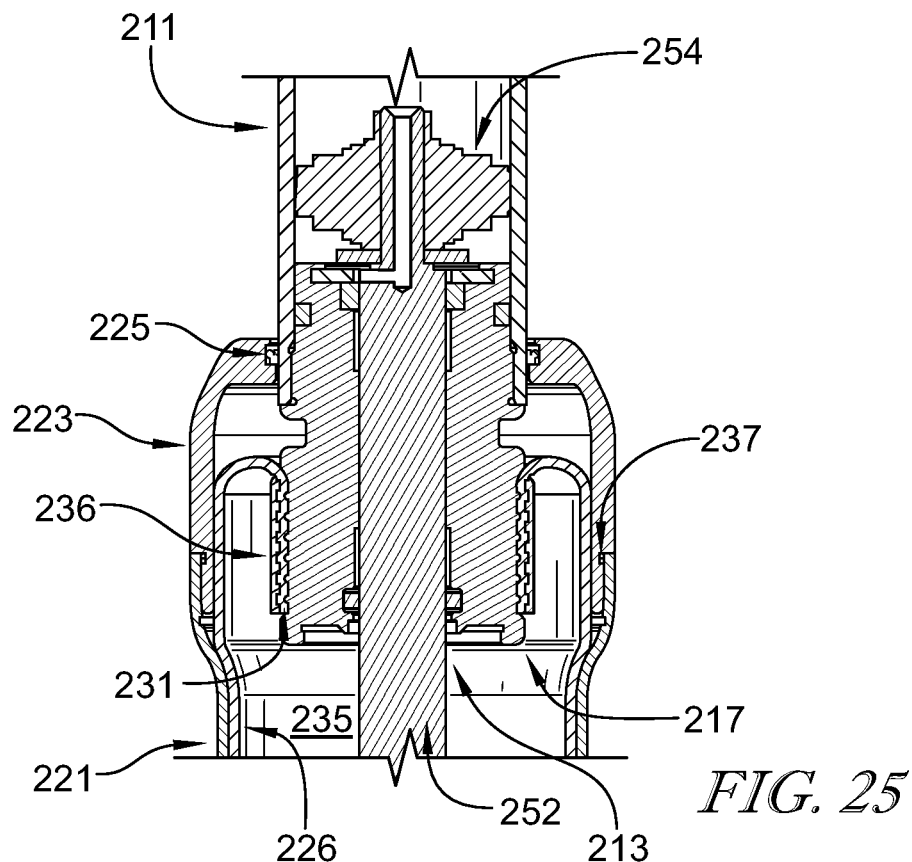
FIG. 25 is an enlarged view of the spring-damper assembly of FIG. 23.
Figure 26:
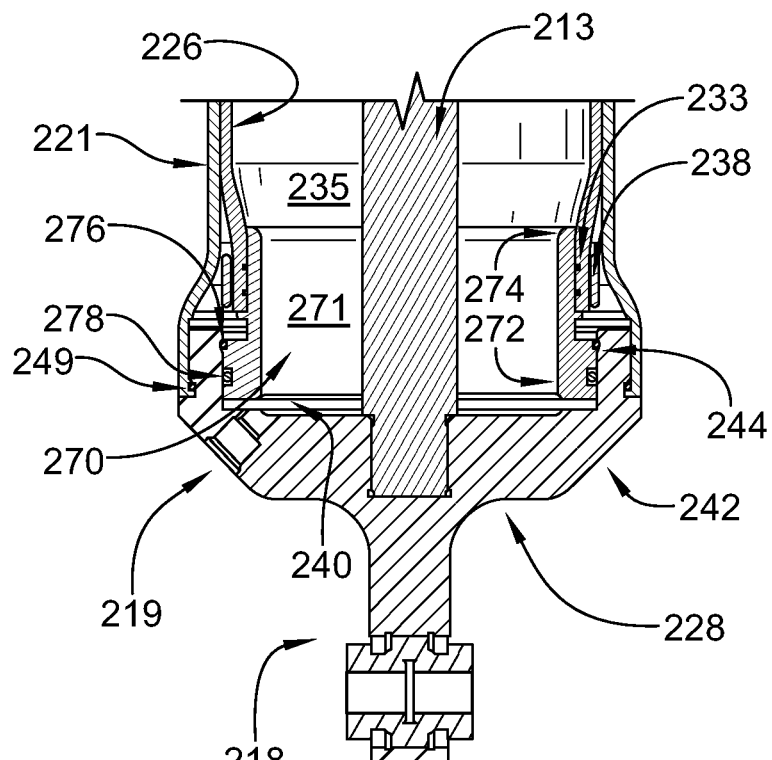
FIG. 26 is an enlarged view of the spring-damper assembly of FIG. 23.
Figure 31:
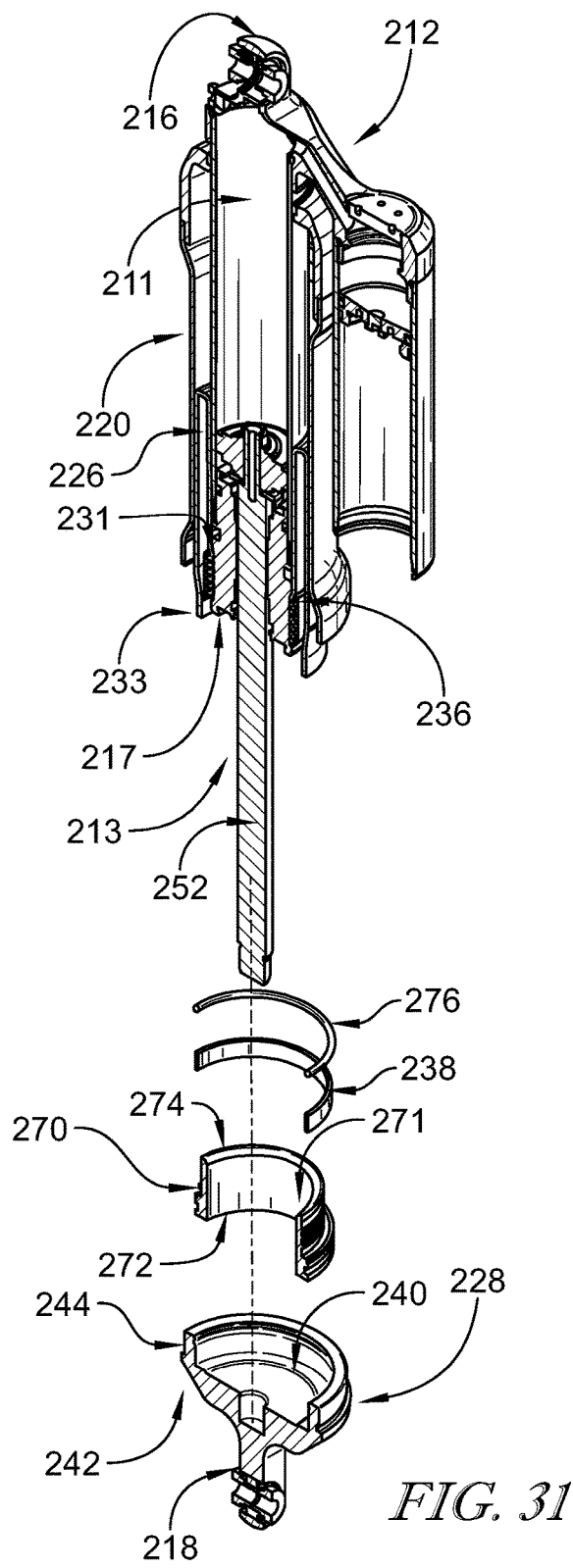

In the illustrative embodiment, as shown in FIGS. 25 and 26, the rolling diaphragm 226 is coupled to the plug 217 with a first clamp 236 and to the fitting 270 with a second clamp 238. In some embodiments, the clamps 236, 238 are formed as a band clamp, crimp clamp, or ratchet clamp, among others. In some embodiments, the clamps 236, 238 are formed from a substantially rigid material, such as plastic or metal. The rolling diaphragm 226 extends between a first end 231 and an opposite second end 233, and defines an interior space 235. As shown in FIG. 23, the first end 231 is inverted to extend toward the second end 233. In some embodiments, the first end 231 is not inverted. The endcap 228 includes a base wall 242 (formed to include the port 219) and a perimeter wall 244 extending from the base wall 242 for engaging with the housing 220. The endcap 228 is also formed to define a cavity 240 (FIG. 31). As shown in FIG. 26, the fitting 270 includes a catch 272 coupled to the endcap 228 and a rim wall 274 extending from the catch 272. A bore 271 extends through the fitting 270. In some embodiments, the fitting 270 is coupled to the endcap 228 with a retainer 276, such as a snap ring, engaged between the catch 272 and an inner surface of the perimeter wall 244. The first end 231 of the rolling diaphragm 226 engages with and seals against the plug 217 (held in place by the first clamp 236), and the second end 233 of the rolling diaphragm 226 engages with and seals against the rim wall 274 of the fitting 270 (held in place by the second clamp 238). In some embodiments, the plug 217 and the rim wall 274 of the fitting 270 are ribbed to provide additional grip for the rolling diaphragm 226 with the plug 217 and the fitting 270.

As shown in FIGS. 23 and 24, the rolling diaphragm 226 is flexible to allow the first end 231 to move toward the second end 233 and roll along itself during movement of the spring-damper assembly 210 toward the retracted position. The interior space 235 of the rolling diaphragm 226, in combination with the plug 217, fitting 270, and endcap 228, defines a pressure chamber that can be controllably pressurized with gas, such as air, to adjust a spring three provided by the adjustable gas spring system 214 and to adjust a length of the spring-damper assembly 210 to control the ride height of a vehicle provided by the spring-damper assembly 210 in the suspension thereof. The port 219 extends through the base wall 242 and into the cavity 240 of the endcap 228 to allow pressurized gas to be supplied to and removed from the interior space 235 of the diaphragm. In the illustrative embodiment, as shown in FIGS. 25 and 26, various sealing elements 237, 249, such as O-rings or other ring seals, are included in the adjustable gas spring system 214 in addition to the seal member 225 to block debris from entering the enclosed gas spring 224. In some embodiments, a sealing element 278 also blocks pressurized gas from escaping the adjustable gas spring system 214 in combination with the diaphragm 226. The housing 220 surrounds the diaphragm 226 to provide radial support, to protect against punctures, and to provide a sealed environment for minimizing wear on the diaphragm 226, such as by blocking dirt and other debris from contact with the diaphragm 226.

In use, the pressure chamber in the enclosed gas spring 224 is pressurized with gas to bias the first and second mounts 216, 218 away from one another as suggested in FIGS. 23 and 24. In the retracted position, the spring-damper assembly 210 is shorter, the first and second mounts 216, 218 are arranged closer together, and the first and second ends 231, 233 of the diaphragm 226 are arranged closer together than in the extended position as shown in FIGS. 23 and 24. Forces exerted on the first and second mounts 216, 218 can move the first and second mounts 216, 218 toward one another. The housing 220 moves relative to the cylinder 211, such as by sliding along the cylinder 211, with movement of the second mount 218 relative to the first mount 218. The piston assembly 213 also moves relative to the cylinder 211, such as by sliding along the cylinder 211. The first end 231 of the diaphragm 226 moves toward the second end 233, and the pressure in the pressure chamber increases to provide additional biasing force for driving the first and second mounts 216, 218 away from one another in response to the forces on the first and second mounts 216, 218. The pressure in the pressure chamber can also be adjusted to change the distance between the first and second mounts 216, 218 for setting a ride height of an associated vehicle.

Figure 29:
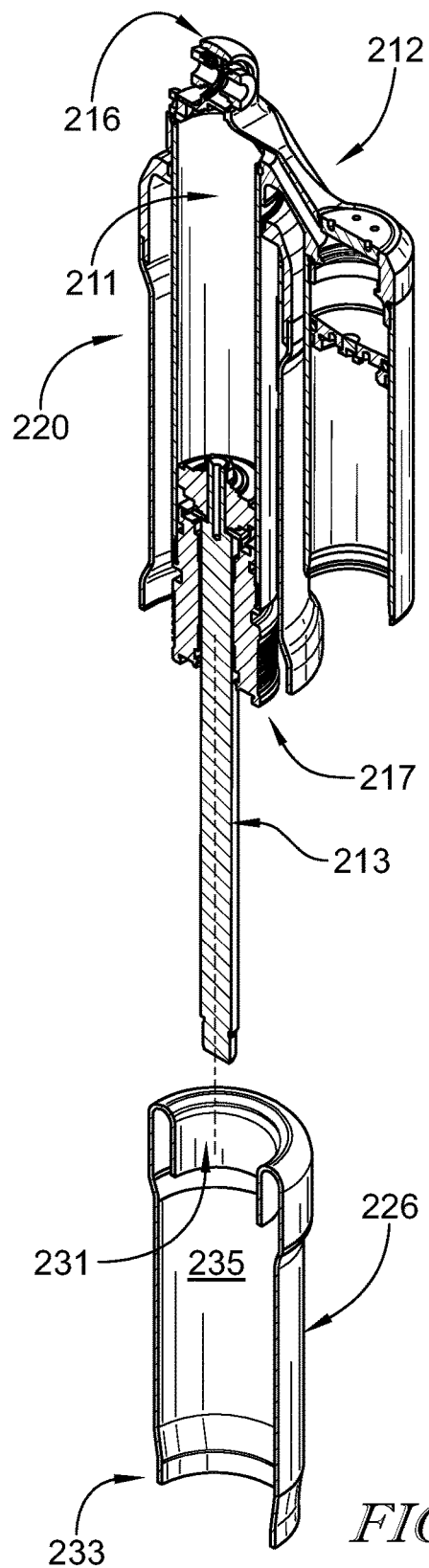
Figure 30:
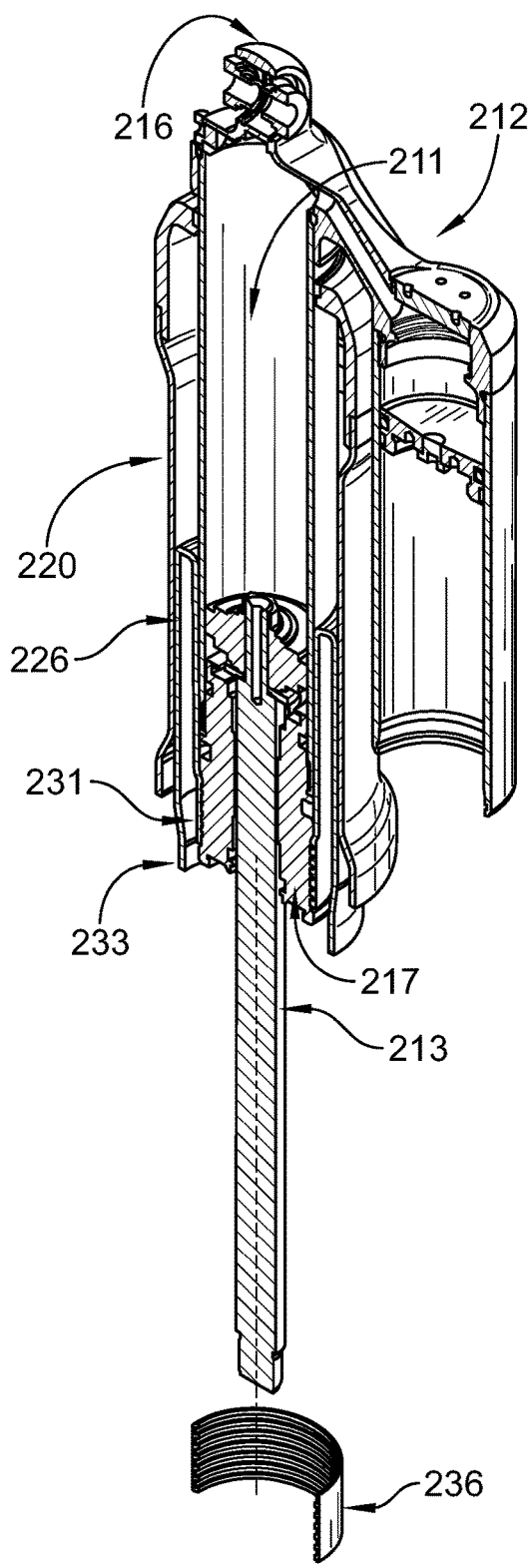
Figure 32:
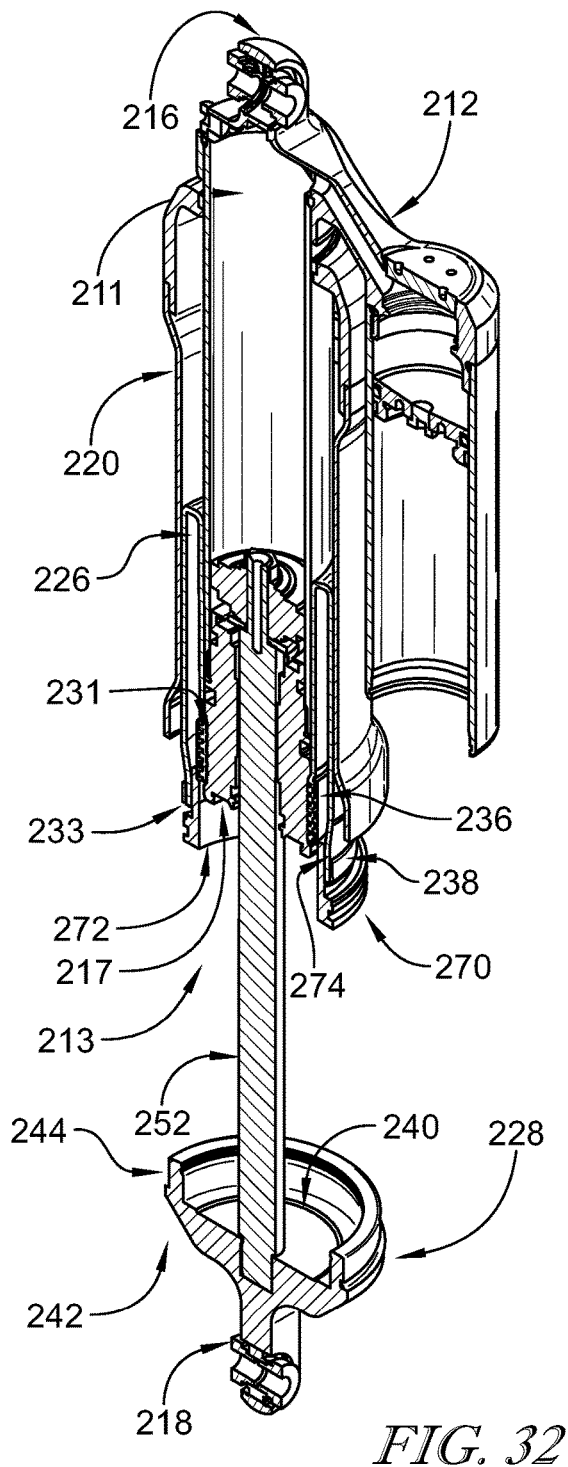
Figure 33:
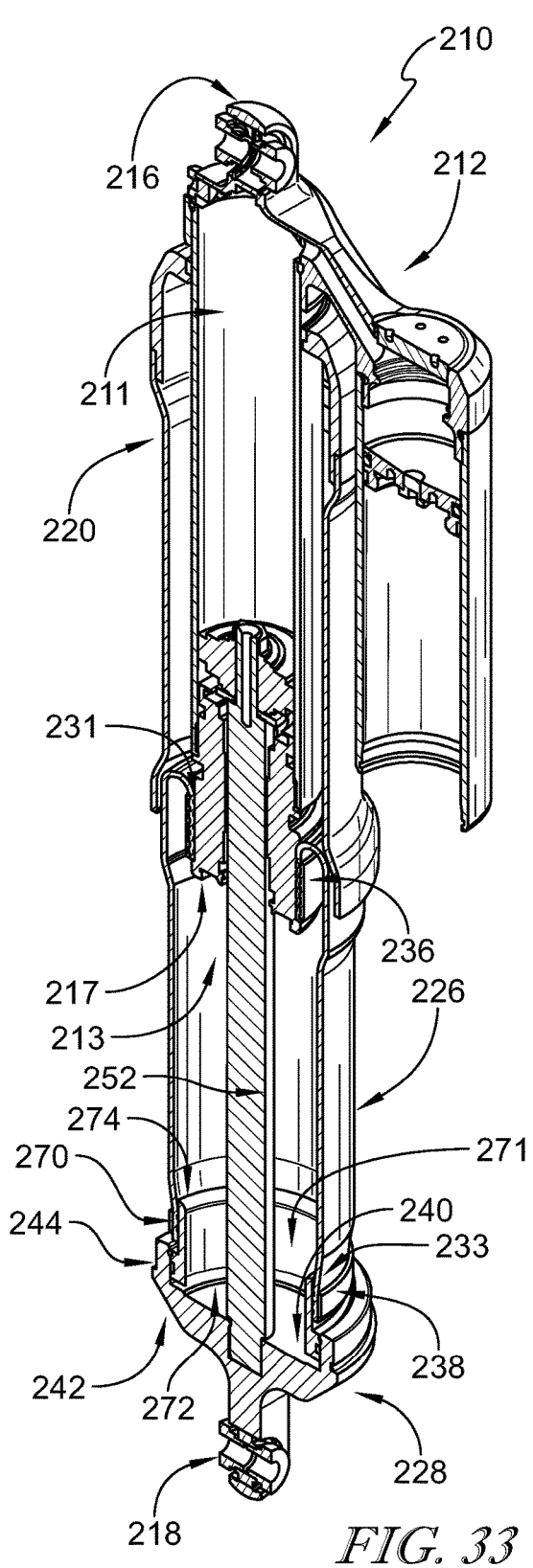
Figure 34:
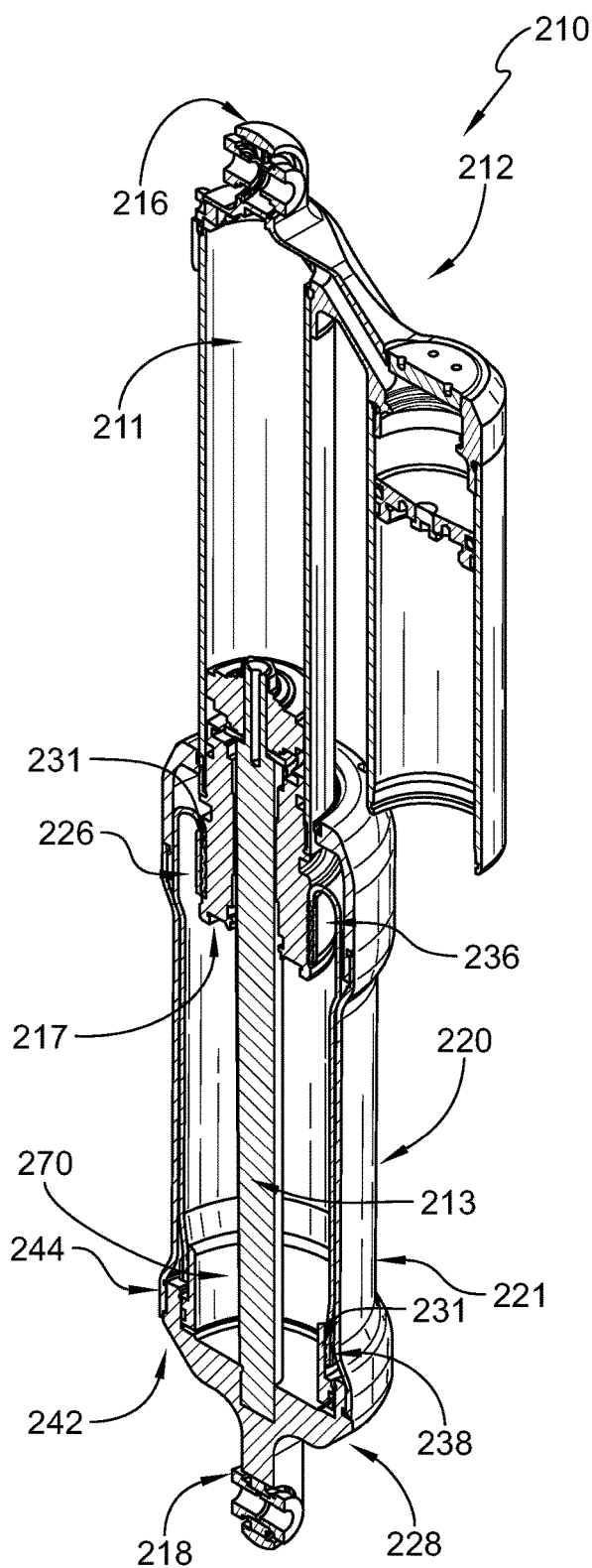

An exemplary process for assembling the spring-damper assembly 10 is illustrated in FIGS. 27-34. The seal member 225 is attached to the cover 223, and the cover 223 is attached to the sleeve 221 as shown in FIG. 27. The assembled portion of the housing 220 slides over the plug 217 and onto the cylinder 211 of the damper 212 as shown in FIG. 28. The first end 231 of the diaphragm 226 is attached to the plug 217, as shown in FIG. 29, and the first clamp 236 is attached over the first end 231 to hold the diaphragm 226 on the plug 217, as shown in FIG. 30. The second end 233 of the diaphragm 226 is attached to the rim wall 274 of the fitting 270, and the second clamp 238 is attached over the second end 233 to hold the diaphragm 226 on the fitting 270 as shown in FIGS. 31 and 32. The endcap 228 is attached to the piston rod 252. The catch 272 of the fitting 270 is received in the cavity 240 of the endcap 228, as shown in FIG. 33, and the sleeve 221 of the housing 220 attaches with the perimeter wall 244 of the endcap 228, as shown in FIG. 34. The spring-damper assembly 210 can be disassembled in reverse order, for example. In some embodiments, the adjustable gas spring system 214 can be removed from the damper 212 and attached to a replacement damper or other damper. Similar to the spring-damper assembly 10, the spring-damper assembly 210 can be attached to a vehicle as part of a suspension thereof in a variety of configurations.

In another exemplary process for assembling the spring-damper assembly 10, the plug 217 is separated from the cylinder 211 and the adjustable gas spring system 214 is assembled onto the plug 217 before attachment to the cylinder 211. For example, the first end 231 of the diaphragm 226 is attached to the plug 217 and the first clamp 236 is attached over the first end 231 to hold the diaphragm 226 on the plug 217. The second end 233 of the diaphragm 226 is attached to the rim wall 274 of the fitting 270, and the second clamp 238 is attached over the second end 233 to hold the diaphragm 226 on the fitting 270. The piston rod 252 extends through the plug 217, diaphragm 226, and fitting 270 to couple with the endcap 228, and the catch 272 of the fitting 270 is received in the cavity 240 of the endcap 228. The sleeve 221 slides over the diaphragm 226 to couple with the perimeter wall 244 of the endcap 228. The seal member 225 is attached to the cover 223, and the cover 223 slides over the cylinder 11. The plug 217 is coupled to the cylinder 211, and the cover 223 couples with the sleeve 221. The spring-damper assembly 210 can be disassembled in reverse order, for example.

Another embodiment of an exemplary adjustable gas spring system 314 in accordance with the present disclosure is shown in FIGS. 35 and 36. In the illustrative embodiment, the adjustable gas spring system 314 includes a tube 322 and an enclosed gas spring 324 coupled to the tube 322 for movement relative to the tube 322. First and second mounts 316, 318 are arranged at opposing ends of the adjustable gas spring system 314 for attachment of the adjustable gas spring system 314 to the frame and suspension of a vehicle, such as a vehicle 300 shown in FIGS. 39 and 40. The adjustable gas spring system 314 is movable between an extended position, shown in FIG. 35, and a retracted position, shown in FIG. 36. A port 319 allows attachment of a control line for controllable adjustment of the adjustable gas spring system 314 between the extended and retracted positions. In some embodiments, the control line can be coupled to an automatic or manual pump for increasing pressure in the adjustable gas spring system 314 to move the adjustable gas spring system 314 toward the extended position to provide an increased ride height for the vehicle 300, for example. Pressure in the adjustable gas spring system 314 can also be decreased to move the adjustable gas spring system 314 toward the retracted position under the weight of the vehicle 300 on the suspension 304.

Figure 37:
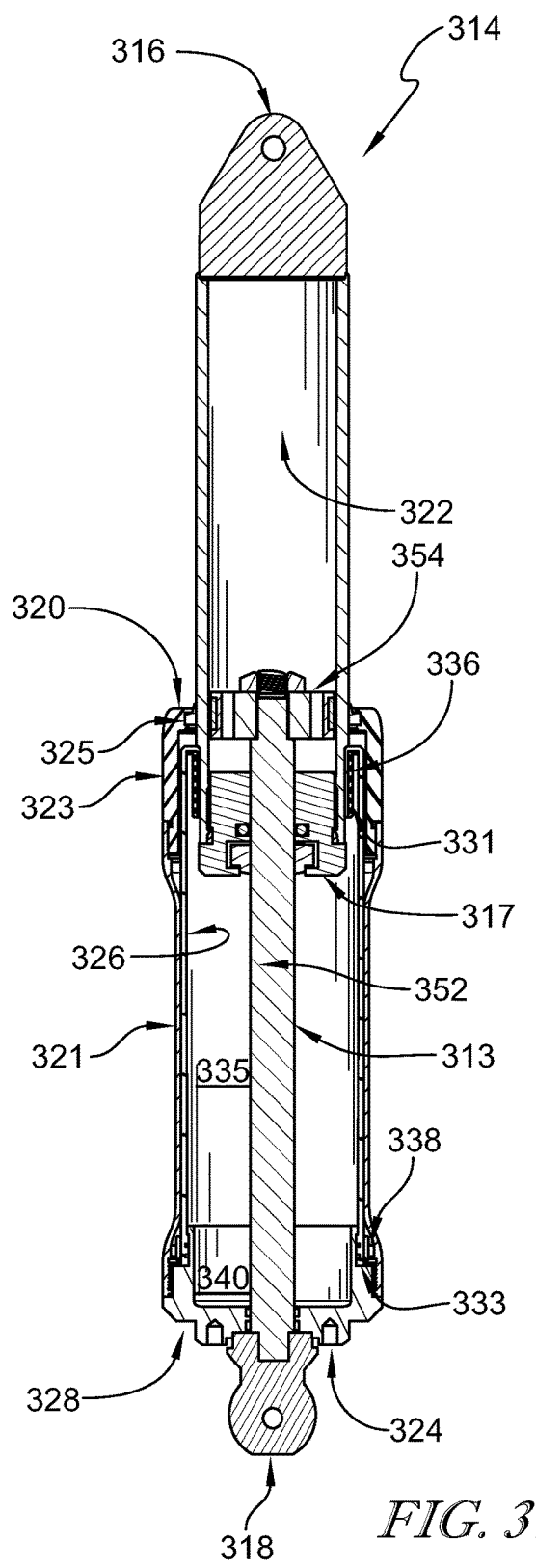
FIG. 37 is a sectional view taken along line 37-37 in FIG. 35 showing that the enclosed gas spring includes a rolling diaphragm and a housing surrounding the rolling diaphragm and suggesting that a seal member is coupled to the housing for movement relative to the tube with the housing and arranged to engage with the housing and the tube to provide a seal for blocking debris from entering the housing.
Figure 38:
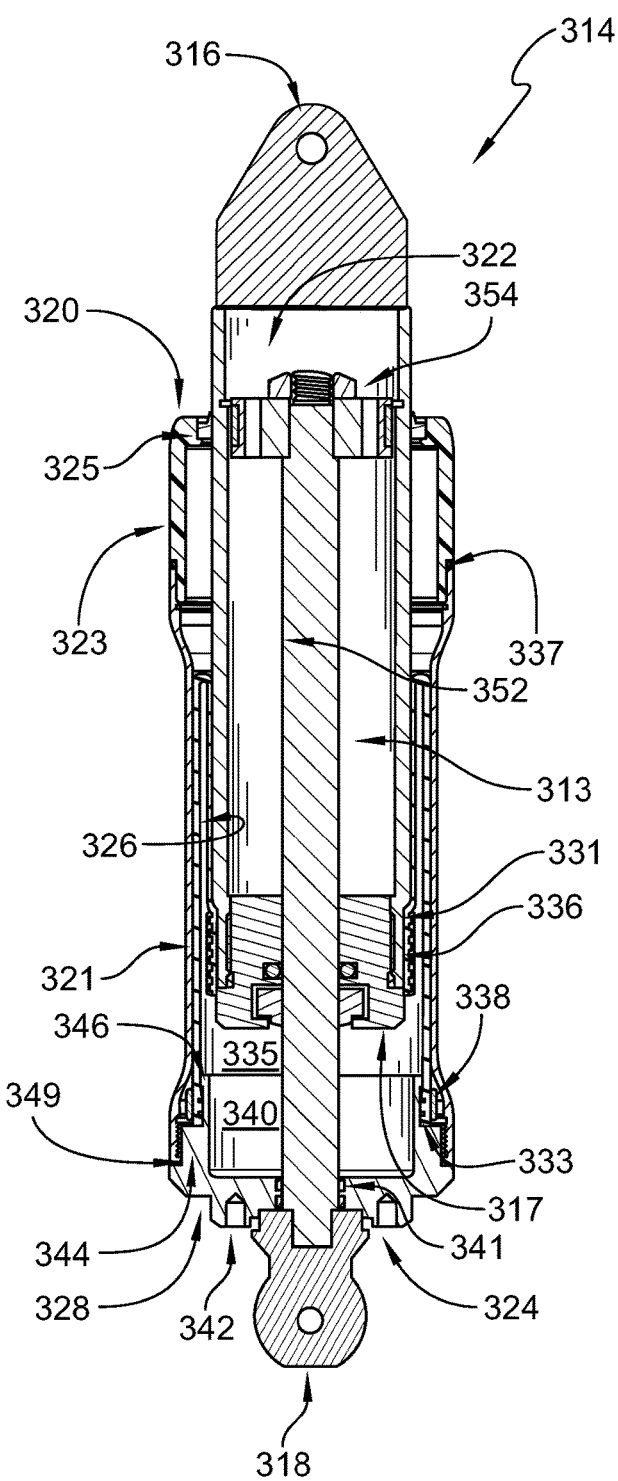
FIG. 38 is a sectional view taken along line 38-38 in FIG. 36.

As shown in FIGS. 37 and 38, the first mount 318 closes and can also seal) one end of the tube 322 and a plug 317 closes and seals an opposite end of the tube 322. A guide rod 313 includes a shaft 352 and a head 354 coupled to the shaft 352. The shaft 352 extends through the plug 317 and into an endcap 328 of the enclosed gas spring 324 to engage with the second mount 318, such as by use of complementary threads, at an opposite end from the head 354. The plug 317 also seals against the shaft 352. The head 354 engages with the tube 322 and the shaft 352 engages with the plug 317 to block tilting or canting of the tube 322 relative to the enclosed gas spring 324. The head 354 is configured to allow free flow of fluid through the head 354 with movement of the guide rod 313 in the tube 322. In the illustrative embodiment, the enclosed gas spring 324 is configured to provide a sealed environment for blocking dirt and other debris from entering the enclosed gas spring 324.

The exemplary enclosed gas spring 324 illustratively includes a rolling diaphragm 326 and a housing 320 surrounding the rolling diaphragm 326 as shown in FIGS. 37 and 38. The rolling diaphragm 326 acts as a pressure vessel having a variable volume and a flexible sidewall. The rolling diaphragm 326 moves with reduced friction because movement is made by a rolling action rather than a sliding one. In some embodiments, the diaphragm 326 is formed from a fabric-reinforced molded elastomer or other resilient flexible material, such as elastomers, polymers, or natural or synthetic rubbers. The housing 320 includes an endcap 328, a sleeve 321 coupled to the endcap 328, a cover 323 coupled to the sleeve 321, and a seal member 325 coupled to the cover 323. The rolling diaphragm 326 is coupled to the tube 322 at one end and to the endcap 328 at an opposite end. In some embodiments, the sleeve 321 is coupled to the endcap 328 by complementary threads. In some embodiments, the cover 323 is coupled to the sleeve 321 by complementary threads. The seal member 325, such as a wiper seal member, is coupled to the housing 320 for movement relative to the tube 322 with the housing 320 and arranged to engage with the housing 320 and the tube 322 to provide a seal for blocking debris from entering the housing 320.

In the illustrative embodiment, as shown in FIGS. 37 and 38, the rolling diaphragm 326 is coupled to the tube 322 with a first clamp 336 and to the endcap 328 with a second clamp 338. In some embodiments, the clamps 336, 338 are formed as a band clamp, crimp clamp, or ratchet clamp, among others. In some embodiments, the clamps 336, 338 are formed from a substantially rigid material, such as plastic or metal. The rolling diaphragm 326 extends between a first end 331 and an opposite second end 333, and defines an interior space 335. As shown in FIG. 37, the first end 331 is inverted to extend toward the second end 333. In some embodiments, the first end 331 is not inverted. The endcap 328 includes a base wall 342 (formed to include the port 319), a perimeter wall 344 extending from the base wall 342 for engaging with the housing 320, and a rim wall 346 extending from the perimeter wall 344. The endcap 328 is also formed to define a cavity 340. The first end 331 of the rolling diaphragm 326 engages with and seals against the tube 322 (held in place by the first clamp 336), and the second end 333 of the rolling diaphragm 326 engages with and seals against the rim wall 346 (held in place by the second clamp 338). In some embodiments, the tube 322 and the rim wall 346 of the endcap 328 are ribbed to provide additional grip for the rolling diaphragm 326 with the tube 322 and the endcap 328.

As shown in FIGS. 37 and 38, the rolling diaphragm 326 is flexible to allow the first end 331 to move toward the second end 333 and roll along itself during movement of the adjustable gas spring system 314 toward the retracted position. The interior space 335 of the rolling diaphragm 326, in combination with the tube 322 and endcap 328, defines a pressure chamber that can be controllably pressurized with gas, such as air, to adjust a spring force provided by the adjustable gas spring system 314 and to adjust a length of the adjustable gas spring system 314 to control the ride height of the vehicle 300 provided by the adjustable gas spring system 314 in a suspension 304 thereof. The port 319 extends through the base wall 342 and into the cavity 340 of the endcap 328 to allow pressurized gas to be supplied to and removed from the interior space 335 of the diaphragm. In the illustrative embodiment, as shown in FIG. 38, various sealing elements 337, 341, 349, such as O-rings or other ring seals, are included in the adjustable gas spring system 314 in addition to the seal member 325 to block debris from entering the enclosed gas spring 324. In some embodiments, the sealing element 341 also blocks pressurized gas from escaping the adjustable gas spring system 314 in combination with the diaphragm 326. The housing 320 surrounds the diaphragm 326 to provide radial support, to protect against punctures, and to provide a sealed environment for minimizing wear on the diaphragm 326, such as by blocking dirt and other debris from contact with the diaphragm 326.

In use, the pressure chamber in the enclosed gas spring 324 is pressurized with gas to bias the first and second mounts 316, 318 away from one another as suggested in FIGS. 37 and 38. In the retracted position, the adjustable gas spring system 314 is shorter, the first and second mounts 316, 318 are arranged closer together, and the first and second ends 331, 333 of the diaphragm 326 are arranged closer together than in the extended position as shown in FIGS. 37 and 38. Forces exerted on the first and second mounts 316, 318, such as during interactions of the wheels 306 with uneven terrain under the vehicle 300, can move the first and second mounts 316, 318 toward one another. The housing 320 moves relative to the tube 322, such as by sliding along the tube 322, with movement of the second mount 318 relative to the first mount 318. The guide rod 313 also moves relative to the tube 322, such as by sliding along the tube 322, The first end. 331 of the diaphragm 326 moves toward the second end 333, and the pressure in the pressure chamber increases to provide additional biasing force for driving the first and second mounts 316, 318 away from one another in response to the forces on the suspension 304 from the wheels 306. The pressure in the pressure chamber can also be adjusted to change the distance between the first and second mounts 316, 318 for setting a ride height of the vehicle 300 (e.g., with the vehicle 300 in a stationary position).

In one exemplary process for assembling the adjustable gas spring system 314, the first mount 318, guide rod 313, and plug 317 are coupled to the tube 322. The cover 323 of the housing 320 is attached to the sleeve 321, and assembled portion of the housing 320 slides over the tube 322. The first end 331 of the diaphragm 326 is attached to the tube 322, and the first clamp 336 is attached over the first end 331 to hold the diaphragm 326 on the tube 322. The second end 333 of the diaphragm 326 is attached to the rim wall 346 of the endcap 328, and the second clamp 338 is attached over the second end 333 to hold the diaphragm 326 on the endcap 328. The sleeve 321 is attached with the perimeter wall 344 of the endcap 328. The adjustable gas spring system 314 can be disassembled in reverse order, for example.

Figure 39:
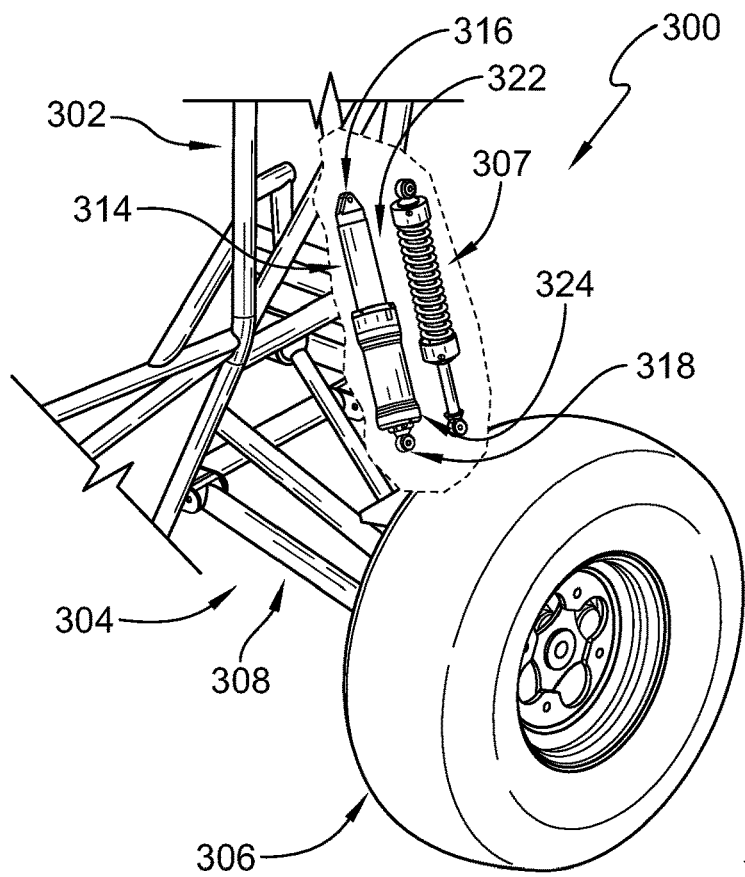
FIG. 39 is an enlarged perspective view of a vehicle showing the adjustable gas spring system of FIG. 35 arranged in a suspension of the vehicle in a first configuration.
Figure 40:
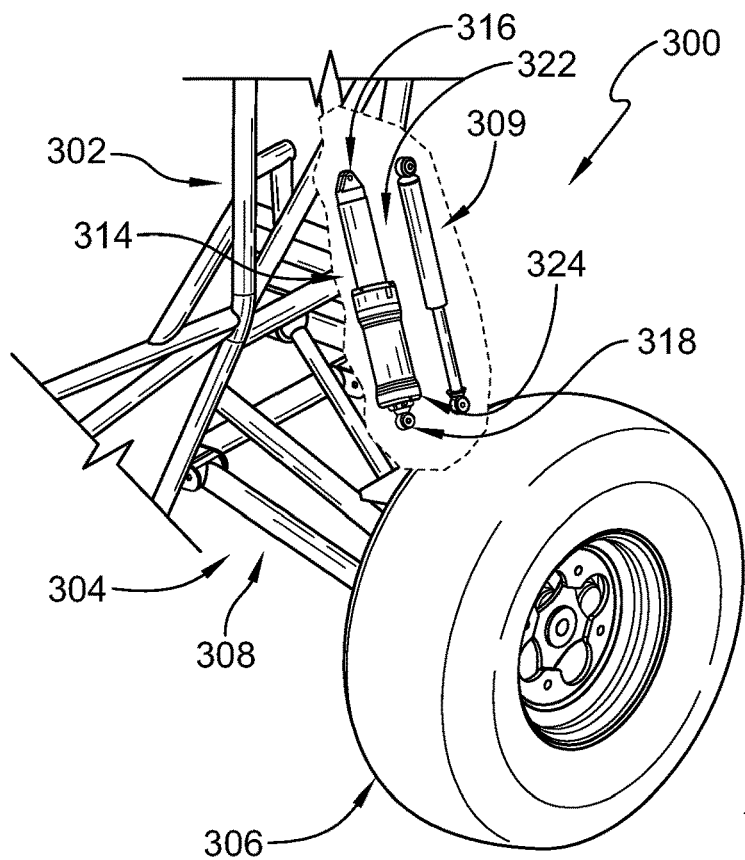
FIG. 40 is a view similar to FIG. 39 showing the adjustable gas spring system of FIG. 35 arranged in the suspension of the vehicle in a second configuration.

As shown in FIGS. 39 and 40, the adjustable gas spring system 314 can be attached to the vehicle 300, similar to the vehicle 100 of FIGS. 1, 19, and 20, as part of the suspension 304 in a variety of configurations. In one configuration, shown in FIG. 39, the first mount 318 is attached to the frame 302, and the second mount 318 is attached to a control arm 308 of the suspension 304. In some embodiments, the adjustable gas spring system 314 can be configured to engage with other portions of the suspension 304, such as wheel hubs, axles, etc. A spring-damper assembly 307 having a damper and associated coil spring can also be arranged in the suspension 304 in combination with the adjustable gas spring system 314. In another configuration, shown in FIG. 40, the adjustable gas spring system 314 is arranged in the suspension 304 in combination with a damper 309. Other configurations and attachments for the adjustable gas spring system 314 with the vehicle 300 are contemplated by the present disclosure.

In illustrative embodiments, the adjustable gas spring systems of the present disclosure (sometimes called air shocks) can be used in vehicle suspension systems of various vehicles, such as but not limited to utility type vehicles (UTVs), all terrain vehicles (ATVs), passenger cars, trucks, sport utility vehicles (SUVs), off road vehicles, motorcycles, and snowmobiles, among other. The adjustable gas spring systems can support or help to support the vehicle weight and can be used as a spring, or combined with a damper to provide a spring and shock absorber in one assembly.

In illustrative embodiments, the spring-damper assemblies of the present disclosure for removing and replacing vehicle suspension components, such as original equipment (OE) coil springs and/or shocks. The adjustable gas spring systems of the present disclosure also allow replacement and/or supplementation of existing vehicle suspension components. The spring-damper assemblies and adjustable gas spring systems can be mounted to the vehicle in a variety of orientations and configurations, such as with the tube and/or cylinder pointing up or down. In some embodiments, the spring-damper assemblies and adjustable gas spring systems can be used with additional attached springs, such as coil springs, mounted on the spring-damper assemblies and adjustable gas spring systems, such as around the tube and/or cylinder.

In illustrative embodiments, the spring-damper assemblies and adjustable gas spring systems of the present disclosure allow for ride height adjustment of the vehicle.

In illustrative embodiments, a spring-damper assembly (sometimes called an adjustable air shock assembly) can include an air spring combined with a partner shock that mounts in place of coil spring shocks in the suspension of a vehicle. The adjustable air shock can include upper and lower mounts for mounting the air shock assembly in the suspension.

In illustrative embodiments, the adjustable air shock assembly can include a rolling diaphragm moveable by pressurized air, with a protective can and a lipped seal sliding on an inner tube or shock body. The rolling diaphragm can be attached to the tube that slides over a shock body portion and for adapting the air spring to the shock absorber or protecting the rolling diaphragm from damaging features on the shock body. In some embodiments, the tube can be threaded onto the damper. The rolling diaphragm can alternatively be attached directly to any part of a shock absorber, such as the shock body or seal carrier. A clamp, such as a crimp ring, can be used to hold the ends of the diaphragm in place. The protective can container for the rolling diaphragm constrains and limits swelling of the diaphragm when the air spring is pressurized, and ends of the protective can could be enclosed and sealed.

In illustrative embodiments, a kit for replacing coil springs on vehicles can include adjustable air shock assemblies having upper and lower mounts for attaching to existing coil spring mounts to the suspension structure of the vehicle, substituting suspension components with adjustable air springs at manufacturing, or supplementing existing suspension systems with adjustable air spring assemblies. The existing suspension components can include a shock absorber, a torsion type spring, a coil type spring, a leaf type spring, other air springs and/or a coil over type shock absorber.

In illustrative embodiments, an adjustable gas spring system can be used with or without a partner shock. In some embodiments, the partner shock is an OE shock with or without modifications for attachment to the adjustable gas spring system.

In illustrative embodiments, the vehicle can include a ride height sensor, valve block, and/or compressed gas source (such as a compressor and/or air tank) connected to a system controller, with a regulated air line (control line) coupled to the adjustable gas spring systems of the suspension. The pressure in the adjustable gas spring system can be adjusted by a driver using an interface connected to the controller, such as a button, switch, or touch screen. The system controller can also detect different loading conditions via the ride height sensors on the vehicle and make air pressure adjustments to each adjustable gas spring system to maintain the desired preset ride settings, such as ride height. In some embodiments, the pressure in the adjustable gas spring system can be adjusted with a manual pump, such as a hand pump.

Examples of other spring-damper assemblies and adjustable gas spring systems are shown in U.S. Pat. Nos. 9,714,066, 8,113,322, 8,292,306, 9,707,817, 9,708,028, and 9,713,945, each of the disclosures of which are incorporated herein by reference in their entireties. Exemplary pressure and height setting controls for adjusting the ride of vehicles using gas springs are disclosed in U.S. Pat. Nos. 10,189,535 and 10,300,981, each of the disclosures of which are incorporated herein by reference in their entireties.

The embodiment(s) detailed herein, and features thereof, may be combined in full or in part with one another or in alternative to one another.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

The use of any and all examples, or exemplary language e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation to encompass all such modifications and equivalent structures and functions.

The invention claimed is:

1. A spring-damper assembly comprising:
   a damper having a cylinder and a piston assembly adapted to move relative to the cylinder; and
   an adjustable gas spring system comprising:
      a diaphragm extending between a first end and an opposite second end and defining an interior space, the first end of the diaphragm held in a fixed position relative to the cylinder of the damper;
      a housing surrounding the diaphragm and coupled to the piston assembly of the damper, the second end of the diaphragm coupled to the housing for movement with the housing relative to the cylinder, the housing configured to provide a sealed environment around the diaphragm for blocking debris from contact with the diaphragm,
      a cover coupled to the housing and positioned radially outwardly of the diaphragm, the cover including an opening wherein the cylinder is configured to be positioned within the opening;
      a seal member coupled to the cover proximate the opening for movement with the cover relative to the cylinder, wherein the seal member is configured to slide along the cylinder, and
      wherein the interior space of the diaphragm is pressurized to bias the second end of the diaphragm away from the first end such that the housing and piston assembly are biased relative to the cylinder toward an extended position.

2. The spring-damper assembly of claim 1, further comprising a tube coupled to the cylinder of the damper and wherein the first end of the diaphragm is coupled to the tube, and wherein the seal member is configured to form a radial seal against and slide along the tube.

3. The spring-damper assembly of claim 1, further comprising a plug coupled to the cylinder of the damper and a second seal member coupled to the housing for movement with the housing relative to the cylinder, wherein the first end of the diaphragm is coupled to the plug.

4. The spring-damper assembly of claim 1, wherein the housing includes a sleeve, the cover coupled to the sleeve, and an endcap coupled to an opposite side of the sleeve from the cover, wherein the piston assembly is coupled to the endcap.

5. The spring-damper assembly of claim 4, wherein the second end of the diaphragm is coupled to the endcap.

6. The spring-damper assembly of claim 4, further comprising a fitting coupled to the endcap, wherein the second end of the diaphragm is coupled to the fitting.

7. The spring-damper assembly of claim 1, wherein the diaphragm is a rolling diaphragm.

8. The spring-damper assembly of claim 7, wherein the first end of the diaphragm is inverted and extends toward the second end.

9. A vehicle comprising:
a frame;
a suspension coupled to the frame; and
a wheel coupled to the suspension,
wherein a spring-damper assembly is arranged in the suspension, the spring-damper assembly comprising:
a damper having a cylinder and a piston assembly adapted to move relative to the cylinder; and
an adjustable gas spring system comprising:
a diaphragm extending between a first end and an opposite second end and defining an interior space, the first end of the diaphragm held in a fixed position relative to the cylinder of the damper;
a rigid housing surrounding the diaphragm and coupled to the piston assembly of the damper, the second end of the diaphragm coupled to the housing for movement with the housing relative to the cylinder, the housing configured to provide a sealed environment around the diaphragm for blocking debris from contact with the diaphragm;
a cover coupled to the housing and positioned radially outwardly of the diaphragm, the cover including an opening and the cylinder is configured to be positioned within the opening;
a seal member coupled to the cover proximate the opening for movement with the cover relative to the cylinder, wherein the seal member is configured to form a seal with and slide along the cylinder, and
wherein the interior space of the diaphragm is pressurized to bias the second end of the diaphragm away from the first end such that the spring-damper assembly is biased toward an extended position for biasing the wheel relative to the frame.

10. The vehicle of claim 9, further comprising a tube coupled to the cylinder of the damper wherein the first end of the diaphragm is coupled to the tube, and wherein the seal member is configured to form a radial seal against and slide along the tube.

11. The vehicle of claim 9, further comprising a plug coupled to the cylinder of the damper and a second seal member coupled to the housing for movement with the housing relative to the cylinder, wherein the first end of the diaphragm is coupled to the plug.

12. The vehicle of claim 9, wherein the housing includes a sleeve, the cover coupled to the sleeve, and an endcap coupled to an opposite side of the sleeve from the cover, wherein the piston assembly is coupled to the endcap, and wherein the seal member is coupled to the cover for movement with the cover relative to the cylinder.

13. The vehicle of claim 12, wherein the second end of the diaphragm is coupled to the endcap.

14. The vehicle of claim 12, further comprising a fitting coupled to the endcap, wherein the second end of the diaphragm is coupled to the fitting.

15. The vehicle of claim 9, further comprising a first mount arranged on the damper and a second mount arranged on the housing, wherein the first mount is coupled to one of the frame and a control arm of the suspension, and wherein the second mount is coupled to the other one of the frame and the control arm.

16. The vehicle of claim 9, wherein the diaphragm is a rolling diaphragm.

17. The vehicle of claim 16, wherein the first end of the diaphragm is inverted and extends toward the second end.

18. An adjustable gas spring system for connection with a damper having a cylinder and a piston assembly adapted to move relative to the cylinder, the adjustable gas spring system comprising:
a diaphragm extending between a first end and an opposite second end and defining an interior space, the first end of the diaphragm arranged to be held in a fixed position relative to the cylinder of the damper;
a rigid housing surrounding the diaphragm and arranged to be coupled to the piston assembly of the damper, the second end of the diaphragm coupled to the housing for movement with the housing relative to the cylinder, the housing configured to provide a sealed environment around the diaphragm for blocking debris from contact with the diaphragm;
a cover coupled to the housing, the cover including an opening that is configured to extend around the cylinder;
a seal member coupled to the cover proximate the opening for movement with the cover relative to the cylinder, wherein the seal member is configured to form a seal with and slide along the cylinder; and
wherein the interior space of the diaphragm is pressurized to bias the second end of the diaphragm away from the first end.

19. The adjustable gas spring system of claim 18, further comprising a tube adapted to be coupled to the cylinder of the damper, wherein the first end of the diaphragm is coupled to the tube, and wherein the seal member is configured to seal against and slide along the tube.

20. The adjustable gas spring system of claim 18, wherein the housing includes a sleeve, the cover coupled to the sleeve, and an endcap coupled to an opposite side of the sleeve from the cover, wherein the piston assembly is coupled to the endcap.

21. The adjustable gas spring system of claim 20, wherein the second end of the diaphragm is coupled to the endcap.

22. The adjustable gas spring system of claim 20, further comprising a fitting coupled to the endcap, wherein the second end of the diaphragm is coupled to the fitting.

23. The adjustable gas spring system of claim 18, wherein the diaphragm is a rolling diaphragm.

24. The adjustable gas spring system of claim 23, wherein the first end of the diaphragm is inverted and extends toward the second end.

* * * * *